(12) United States Patent
Lee et al.

(10) Patent No.: US 11,713,919 B2
(45) Date of Patent: Aug. 1, 2023

(54) REFRIGERATOR

(71) Applicant: LG Electronics Inc., Seoul (KR)

(72) Inventors: Changjae Lee, Seoul (KR); Jinsung Kim, Seoul (KR); Eunyoung Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 758 days.

(21) Appl. No.: 16/557,642

(22) Filed: Aug. 30, 2019

(65) Prior Publication Data

US 2020/0072544 A1 Mar. 5, 2020

(30) Foreign Application Priority Data

Aug. 30, 2018 (KR) .................. 10-2018-0102999

(51) Int. Cl.
```
F25D 29/00      (2006.01)
F25D 11/02      (2006.01)
G05B 19/4155    (2006.01)
F25D 23/02      (2006.01)
```
(52) U.S. Cl.
CPC ............ *F25D 29/005* (2013.01); *F25D 11/02* (2013.01); *F25D 23/028* (2013.01); *G05B 19/4155* (2013.01); *G05B 2219/2654* (2013.01)

(58) Field of Classification Search
CPC ...... F25D 29/005; F25D 11/02; F25D 23/028; F25D 2323/023; F25D 29/00; G05B 19/4155; G05B 2219/2654
See application file for complete search history.

(56) References Cited

U.S. PATENT DOCUMENTS

| 8,009,852 B2 | 8/2011 | Gratke et al. |
| 9,866,662 B2 | 1/2018 | Lee et al. |
| 2015/0258942 A1 | 9/2015 | Kawamata |
| (Continued) | | |

FOREIGN PATENT DOCUMENTS

| CN | 101203056 | 6/2008 |
| CN | 202310030 | 7/2012 |
| (Continued) | | |

OTHER PUBLICATIONS

Office Action in Korean Appln. No. 10-2018-0120980, dated Dec. 14, 2021, 11 pages (with English translation).

(Continued)

*Primary Examiner* — Kun Kai Ma
(74) *Attorney, Agent, or Firm* — Fish & Richardson P.C.

(57) ABSTRACT

A refrigerator includes a cabinet defining a storage space therein and a door configured to open and close at least a portion of the storage space. The door includes a top recess that is recessed downward from a top surface portion of the door, a microphone module accommodated in the top recess and configured to receive a voice command from a user, a controller configured to control an operation of the refrigerator based on the voice command received at the microphone module, a door cover that covers the top recess a microphone-module mount provided at the door cover, wherein the microphone module is accommodated in the microphone-module mount, and a voice input hole defined in the microphone-module mount and configured to transmit a sound of the voice command from an outside of the door cover to an interior of the microphone-module mount.

21 Claims, 17 Drawing Sheets

(56) References Cited

U.S. PATENT DOCUMENTS

2017/0370636 A1  12/2017  Koo et al.
2018/0031312 A1  2/2018  Kim et al.

FOREIGN PATENT DOCUMENTS

| | | | | |
|---|---|---|---|---|
| CN | 104812625 | 7/2015 | | |
| CN | 204633969 | 9/2015 | | |
| CN | 204787546 | 11/2015 | | |
| CN | 205403317 | 7/2016 | | |
| CN | 205403317 U * | 7/2016 | | |
| CN | 106016924 | 10/2016 | | |
| CN | 205647874 | 10/2016 | | |
| CN | 106068431 | 11/2016 | | |
| CN | 106205435 | 12/2016 | | |
| CN | 106322899 | 1/2017 | | |
| CN | 106949689 | 7/2017 | | |
| CN | 107024070 | 8/2017 | | |
| CN | 206533415 | 9/2017 | | |
| CN | 107664385 | 2/2018 | | |
| CN | 108253713 | 7/2018 | | |
| EP | 1154617 | 11/2001 | | |
| EP | 3086061 | 10/2016 | | |
| EP | 3343157 | 12/2017 | | |
| JP | 2017133818 | 8/2017 | | |
| KR | 1019990041832 | 6/1999 | | |
| KR | 10-0650280 | 11/2006 | | |
| KR | 10-2017-0024363 | 3/2017 | | |
| KR | 20170059083 | 5/2017 | | |
| KR | 1020180079835 | 7/2018 | | |
| WO | WO-2017034332 A1 * | 3/2017 | .......... | F21V 23/0471 |
| WO | WO2014208585 | 1/2020 | | |

OTHER PUBLICATIONS

EP Search Report in European Application No. EP 19194360, dated Jan. 17, 2020, 10 pages.

Extended European Search Report in European Appln. No. 21175902.2, dated Sep. 15, 2021, 12 pages.

Office Action in Chinese Appln. No. 201910702430.0, dated Jul. 2, 2021, 23 pages (with English translation).

Chinese Office Action in Chinese Appln. No. 201910702430.0, dated Jan. 28, 2021, 13 pages (with English translation).

Office Action in Korean Appln No. 10-2018-0157280, dated Feb. 13, 2023, 18 pages(with English translation).

* cited by examiner

REFRIGERATOR

CROSS-REFERENCE TO RELATED APPLICATIONS

The present application claims priority under 35 U.S.C. 119 and 35 U.S.C. 365 to Korean Patent Application No. 10-2018-0102999, filed on Aug. 30, 2018, which is hereby incorporated by reference in its entirety.

TECHNICAL FIELD

The present disclosure relates to a refrigerator.

BACKGROUND

Generally, a refrigerator is a household appliance that makes it possible to store food at low temperatures in an internal storage space that is shielded by a door. Generally, the refrigerator is configured to store the stored food in an optimum state by cooling the inside of the storage space via cool air generated from heat exchange with refrigerant circulating as part of a refrigeration cycle.

Recently, refrigerators have become increasingly large and multifunctional in accordance with changes in diet and product trends. A refrigerator having various convenience devices for improving user's convenience has been introduced.

In recent years, various refrigerators have been developed to enable a user to control the operation of a refrigerator by voice. In the case of a refrigerator, voice command may especially helpful since both hands of a user may be holding a food object.

SUMMARY

According to one aspect of the subject matter described in this application, a refrigerator includes a cabinet defining a storage space therein and a door configured to open and close at least a portion of the storage space. The door includes a top recess that is recessed downward from a top surface portion of the door, a microphone module accommodated in the top recess and configured to receive a voice command from a user, a controller configured to control an operation of the refrigerator based on the voice command received at the microphone module, a door cover that covers the top recess, a microphone-module mount provided at the door cover, wherein the microphone module is accommodated in the microphone-module mount, and a voice input hole defined in the microphone-module mount and configured to transmit a sound of the voice command from an outside of the door cover to an interior of the microphone-module mount.

Implementations according to this aspect may include one or more of the following features. For example, the microphone-module mount may protrude vertically upward from the door cover. The voice input hole may be oriented toward a forward direction of the refrigerator, a height of the microphone-module mount being greater than a diameter of the voice input hole. In some cases, the microphone-module mount may include a protrusion protruding vertically upward from the door cover, and an inclined portion extending downward from the protrusion toward a forward direction of the refrigerator. Here, the input hole may be defined at the inclined portion.

In some implementations, the microphone-module mount may define a downwardly recessed depression that is positioned forward of the inclined portion, wherein the inclined portion extends downward to a bottom of the depression. A hole guide that protrudes from the inclined portion may be disposed around the voice input hole, wherein a protrusion length of the hole guide from the inclined portion decreases in a downward direction such that a slope of a front face of the hole guide is greater than a slope of the inclined portion. The microphone module may be mounted on a rear face of the inclined portion, the microphone module being spaced from an inner surface of the top recess. The microphone module may include a microphone substrate extending along and disposed on the inclined portion, a microphone element placed on the microphone substrate and located at a position corresponding to the voice input hole, and a sealing member surrounding the microphone element and disposed between and in direct contact with the microphone substrate and the rear face of the inclined portion.

In some implementations, the sealing member may be made from an elastic material and has a thickness that is greater than that of the microphone element. A microphone-module support supporting the microphone module thereon may be mounted on a bottom face of the microphone-module mount. In some cases the microphone-module support may include a mounting face portion in contact with and coupled to the protrusion, and a supporting face portion extending from a front end of the mounting face portion and having a same slope as the inclined portion. The microphone module may be mounted on the supporting face portion. The microphone-module support may have a connector hole defined therein, the connector hole exposing a microphone connector protruding downward from the microphone substrate. The microphone-module mount may further include front and rear ribs respectively extending along front and rear ends of the inclined portion, wherein the front and rear ribs protrude downward and contact front and rear ends of the microphone module respectively to receive the microphone module therebetween, Here, the microphone-module support may further include upper ribs and lower ribs respectively extending along front and rear ends of the supporting face portion and being in contact with outer sides of the front ribs and rear ribs respectively.

In some implementations, the voice input hole may include a plurality of voice input holes that are spaced apart from each other, wherein the microphone module may include a plurality of microphone elements corresponding to the plurality of voice input holes. In some cases, the refrigerator according to this aspect may further include a speaker module accommodated in the top recess and configured to audibly output a refrigerator operation status and information, a speaker-module receiving portion recessed in the door cover at a position of the door cover corresponding to the speaker module, wherein the speaker module is accommodated in the speaker-module receiving portion, a sound output hole defined in the speaker-module receiving portion, wherein a sound output unit of the speaker module is in communication with the sound output hole, and a speaker-module covering the speaker-module receiving portion, wherein the speaker module cover covers the sound output hole. An outer perimeter of the speaker-module cover may be spaced from an outer perimeter of the speaker-module receiving portion. A protruding edge may extend around the sound output hole to filter dust from entering into the sound output hole, wherein the protruding edge protrudes to a vertical level below a bottom face of the speaker-module cover. The top recess may receive therein a voice-recognition printed circuit board (PCB) connected to the microphone module and configured to process a signal input from the microphone module. The top recess may house therein a door opening mechanism configured to push the cabinet to open the door, wherein the door opening mechanism is activated based on the voice command from the voice command received by the microphone module.

According to another aspect, a refrigerator includes a cabinet defining a storage space therein, a door configured to open and close at least a portion of the storage space, a cap decoration mounted on a top surface portion of the door, wherein the cap decoration has a top recess defined therein, a microphone module accommodated in the top recess and configured to receive a voice command from a user, a controller configured to control an operation of the refrigerator based on the voice command input to the microphone module, a door cover that covers the top recess, a microphone-module mount protruding upward from the door cover at a position corresponding to the microphone module, wherein the microphone module is mounted on the microphone-module mount, and a voice input hole defined at an inclined edge of the microphone-module mount and opened toward a forward direction of the refrigerator, wherein the voice input hole is in communication with the microphone module.

DETAILED DESCRIPTION

Figure 1:
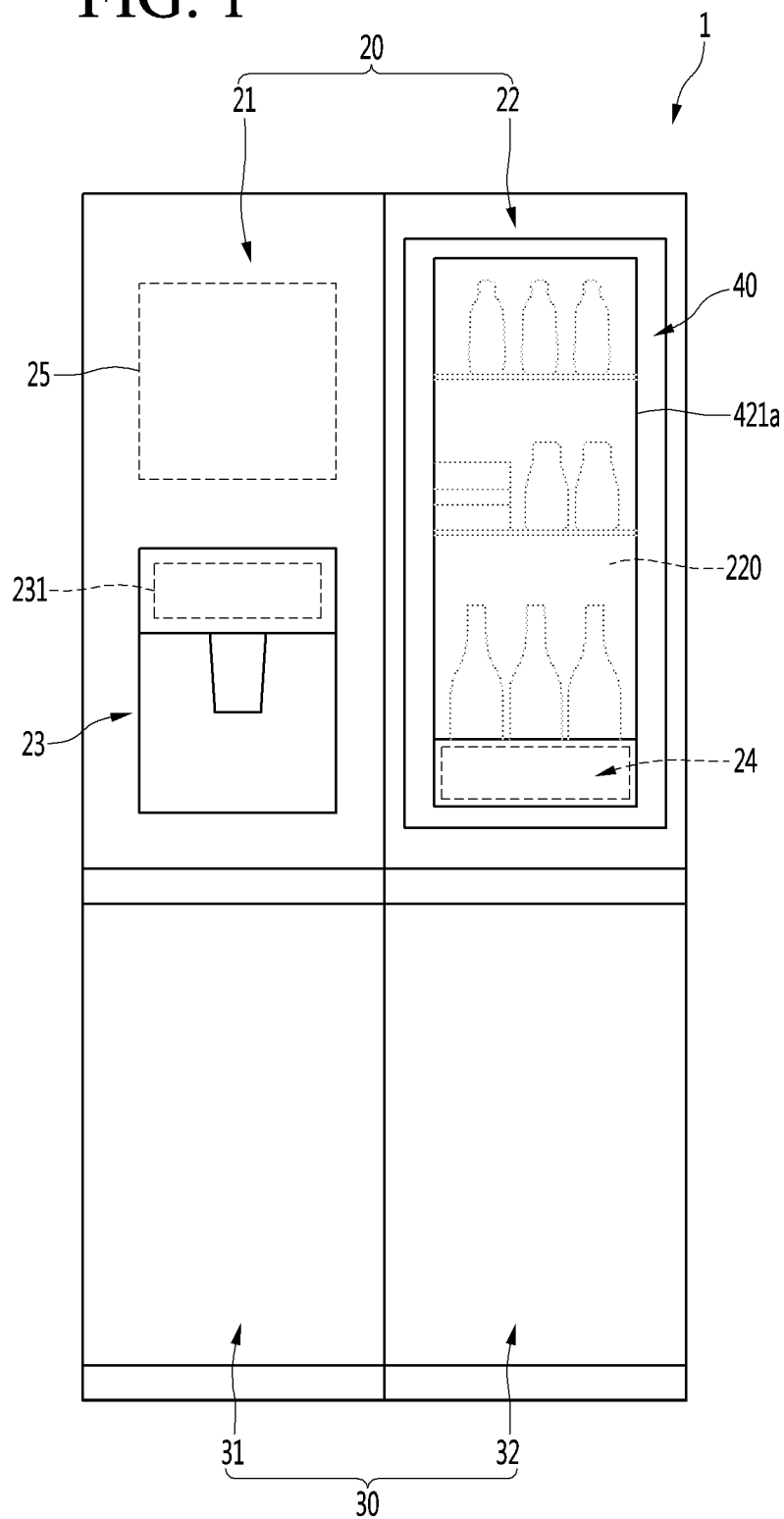
FIG. 1 is a front view of an example refrigerator according to an implementation of the present disclosure.
Figure 2:
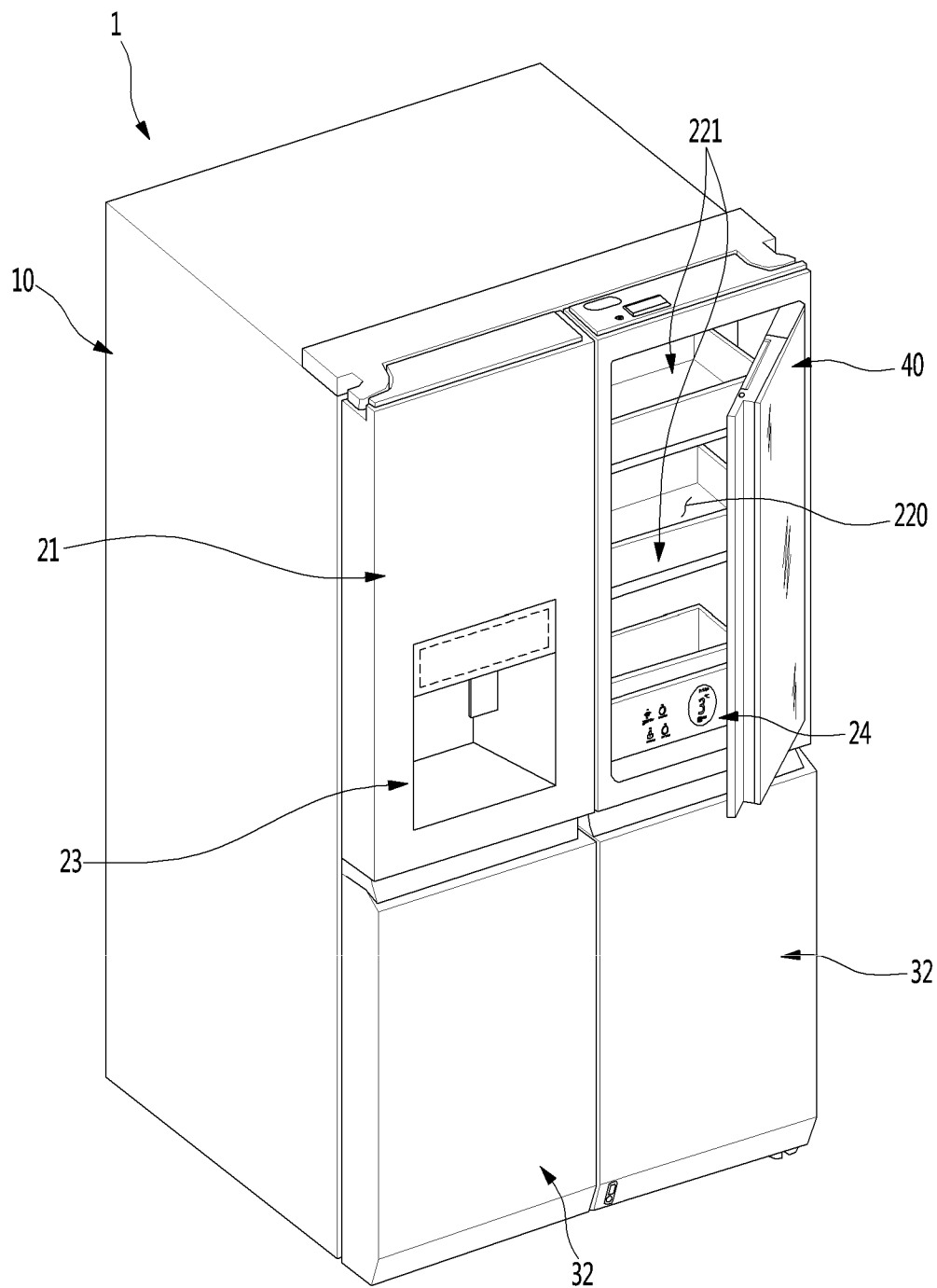
FIG. 2 is a perspective view of the refrigerator.
Figure 3:
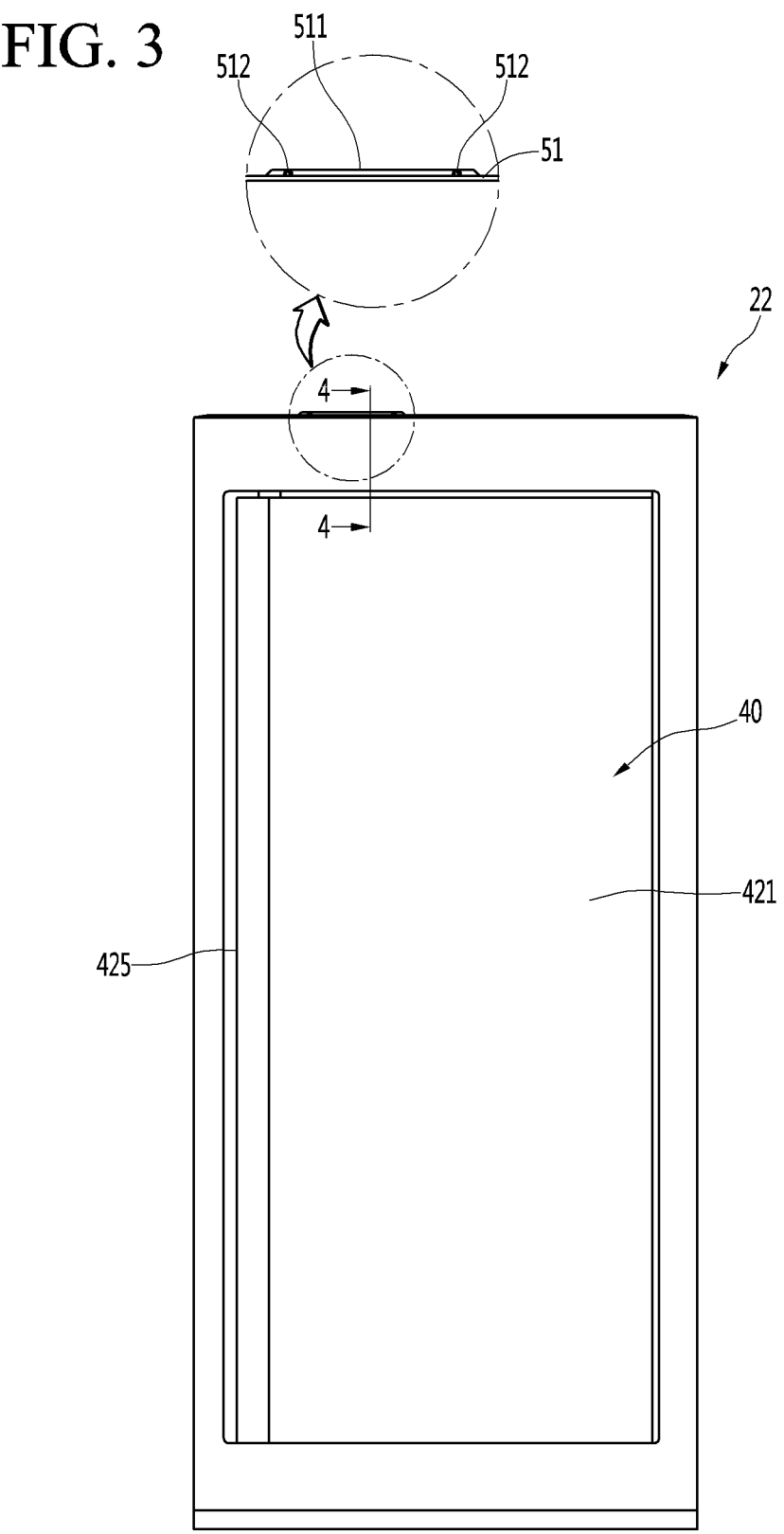
FIG. 3 is a front view of a refrigerator door according to an implementation of the present disclosure.

FIG. 1 is a front view of a refrigerator according to an implementation of the present disclosure. FIG. 2 is a perspective view of the refrigerator. FIG. 3 is a front view of a refrigerator door in accordance with an implementation of the present disclosure.

As shown in the figures, an external appearance of a refrigerator 1 according to an implementation of the present disclosure may be defined by a cabinet 10 having a storage space therein and a door for opening and closing the storage space.

The interior of the cabinet 10 may be partitioned vertically into upper and lower sections. For example, a refrigerating compartment may be defined in an upper portion of the cabinet 10 and a freezing compartment may be defined in a lower portion of the cabinet 10. In another example, the interior of the cabinet 10 may be partitioned into left and right sections. The refrigerating compartment and freezing compartment may be respectively defined in left and right portions of the cabinet 10 or vice versa.

The door may include a refrigerating compartment door 20 and a freezing compartment door 30. The refrigerating compartment door 20 and the freezing compartment door 30 may pivot to close or open the refrigerating compartment and the freezing compartment, respectively.

The refrigerator compartment door 20 may include a pair of a left refrigerating compartment door 21 and a right refrigerating compartment door 22 for opening and closing the refrigerating compartment as defined in an upper portion of the cabinet 10. The freezing compartment door 30 may include a pair of a left freezing compartment door 31 and a right freezing compartment door 32 for opening and closing the freezing compartment defined in an lower portion of the cabinet 10.

The implementations of the present disclosure may be applied to all types of doors of a refrigerator, regardless of the shape and structure of the door. For convenience of explanation and understanding, a refrigerator including the refrigerating compartment door and the freezing compartment door will be described as an example.

In one example, an ice maker 25 may be provided on the inner surface of the left refrigerating compartment door 21. The ice maker 25 is a device for making and storing ice via automatic watering. The ice maker 25 may be provided inside a heat insulating space formed in the back surface of the left refrigerating compartment door 21.

Further, a dispenser 23 may be provided on the front face of the left refrigerating compartment door 21. The dispenser 23 allows the ice or purified water produced by the ice maker 25 to be taken out. The dispenser 23 allows the extraction of water or ice based on external manipulation of the user.

An auxiliary display 231 may be provided above the dispenser 23. The auxiliary display 231 may display the operation status of the dispenser 23 and the refrigerator 1, and may be configured to receive a control input from the user. The auxiliary display 231 may perform the functions of the display 24, for example, if the right refrigerating compartment door 22 is not provided with a display 24.

The right refrigerating compartment door 22 may have an opening 220 defined in its center. A door basket 221 may be provided inside the opening 220. A sub-door 40 for opening and closing the opening 220 may be provided. Thus, the user will be able to access the door basket 221 by opening and closing the sub-door 40.

The sub-door 40 may be pivotally axially coupled at one side end thereof to the cabinet. A handle 425 may be recessed in the other side end of the sub-door to facilitate pivotal manipulation of the sub-door 40.

The sub-door 40 may at least partially be selectively transparent or opaque. Accordingly, the sub-door 40 can allow the user to visually check the inside of the opening 220 even when the sub-door 40 is closed.

Further, the display 24 may be provided below the opening 220. The display 24 can display the operation status of the refrigerator and allow the user to manipulate the operation of the refrigerator 1.

Accordingly, when the display 24 is turned on even when the sub-door 40 is closed, the user can check the output information of the display 24 through the sub-door 40.

In one example, as shown in FIG. 3, a microphone-module mount 511 in which a microphone module 53 for receiving a voice of a user is mounted may protrude from a top face of the right refrigerating compartment door 22. The microphone module 53 may be provided inside the microphone-module mount 511.

The microphone module 53 and the microphone-module mount 511 may be disposed to the left of a center of the right refrigerating compartment door 22. As illustrated, the refrigerating compartment doors 20 are provided at left and right sides respectively. Thus, when the microphone module 53 is placed on the left side of the right refrigerating compartment door 22, the microphone is more likely to recognize the user voice when the user is speaking at the center in front of the refrigerator 1.

The microphone-module mount 511 may not be visible to the user when viewed from the front due to its shape and location. For example, since the height of the refrigerator is usually greater than the user's height, the microphone-module mount 511 may not be visible to the user in normal use. Further, since the user is located away from the refrigerator 1, the microphone-module mount 511 and a voice input hole 512 defined in the microphone-module mount 511 may be less visible.

In other words, the microphone-module mount 511 may have a position and structure that ensures high voice recognition performance while minimizing external exposure thereof to the user. Hereinafter, the structure of the microphone-module mount 511 and the microphone module 53 will be described in more detail.

Further, the implementations of the present disclosure disclose an example in which the microphone module 53 is provided on the right refrigerating compartment door 22. However, the present disclosure is not limited thereto. The implementations of the present disclosure may be applied to any type of refrigerators where a cap decoration is formed on the top face of the door. Hereinafter, the right refrigerating compartment door 22 will be referred to as a door 22.

Figure 4:
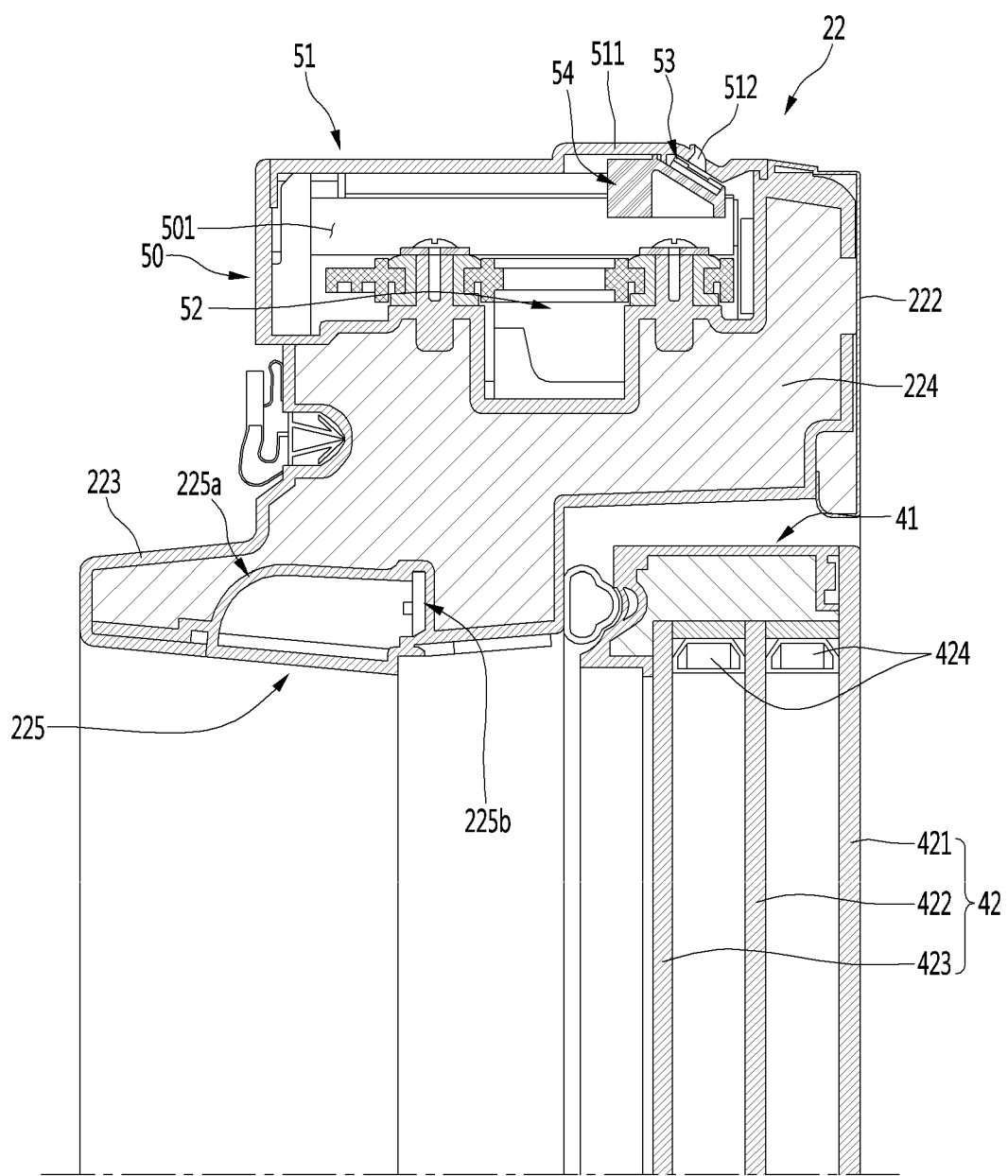
FIG. 4 is a cross-section taken along a line 4-4' FIG. 3.
Figure 5:
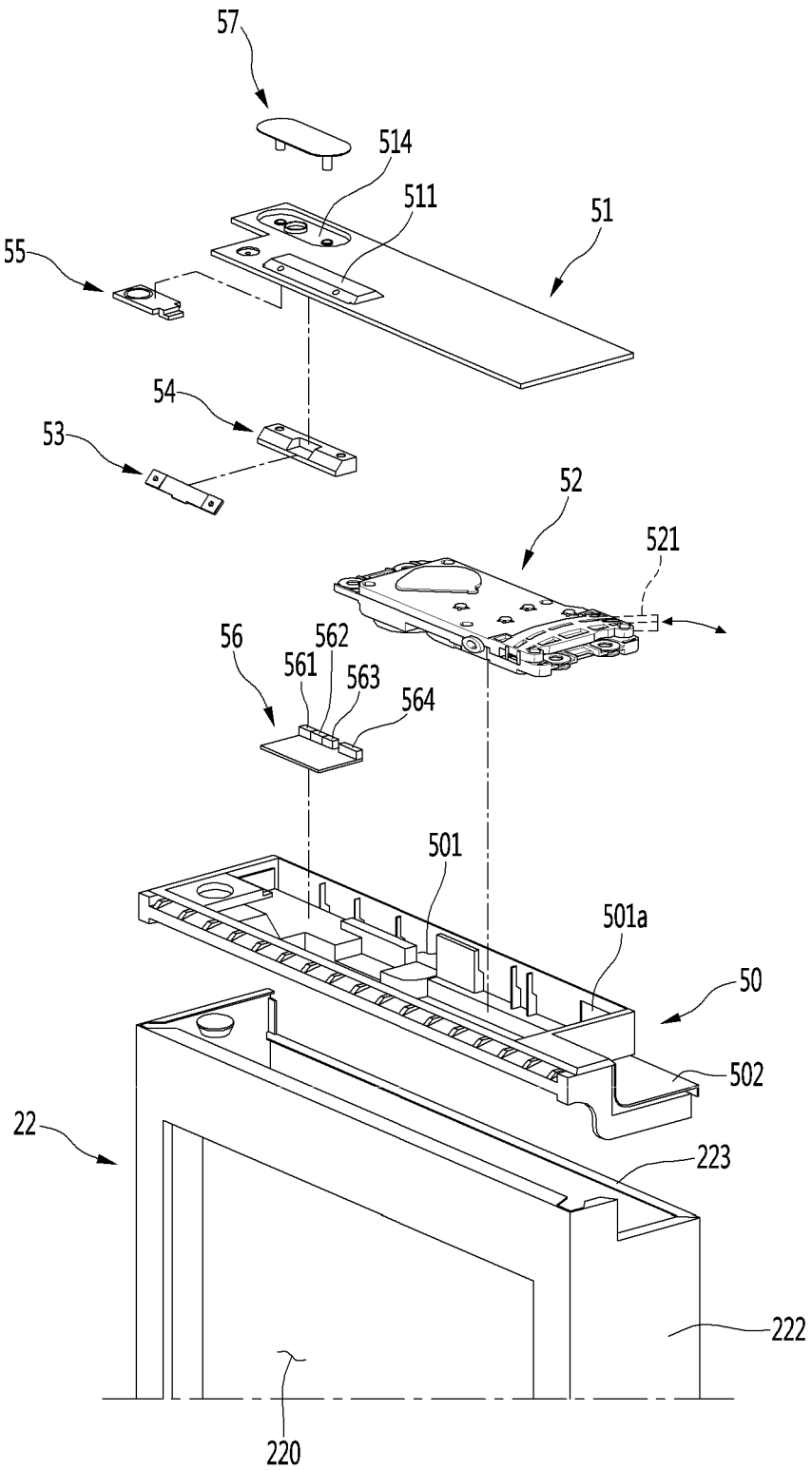
FIG. 5 is an exploded perspective view of a top portion of the refrigerator door.

FIG. 4 is a cross-section taken along a line 4-4' in FIG. 3. FIG. 5 is an exploded perspective view of a top portion of the refrigerator door.

As shown, the sub-door 40 may have a door frame 41 defining a contour of the door and opened in a center thereof, and a panel assembly 42 mounted to the door frame 41 to shield the opened center of the door frame 41.

The panel assembly 42 may include a plurality of glass 421, 422, and 423 which are spaced from each other back and forth, and spacers 424, each disposed between adjacent glass members 421, 422, and 423. The spacers 424 may support the plurality of glasses 421, 422, 423 at the peripheries thereof. The plurality of glasses 421, 422 and 423, thus arranged in a spaced apart manner, may define insulating spaces between them. At least one glass 421 may be made of as an insulating glass.

The panel assembly 42 may define the front and rear faces of the sub-door 40 while mounted on the door frame 41. In particular, the glass 421 defining the front face of the panel assembly 42 is configured to be larger than each of the other glasses 422 and 423 so that a projecting edge of the glass 421 may be seated on the door frame 41 and the glass 421 defines the entire front face of the sub-door 40. Further, a film or a coating layer of a specific color may be formed on the glass 421 so that the inside of the opening 220 may be selectively transparent.

In one example, the door 22 may include an out plate 222 defining a front face and an outer circumference of the door 22, and a door liner 223 defining a rear face of the door 22 and being in combination with the out plate 222. The out plate 222 may be made of a metal material. A portion of the out plate 222 corresponding to the opening 220 may be constructed to be opened.

The door liner 223 may define the back surface of the door 22 and the inner surface of the opening 220. In another example, a separate frame may be further disposed to define the inner surface of the opening 220 as needed. Each of the out plate 222 and the door liner 223 may be coupled to both sides of the frame.

A door light 225 may be mounted on the door liner 223 defining the inner face of the opening 220. The door light 225 may include an LED module 225b and a light case 225a that accommodates the LED module 225b. The light emitted from the LED module 225b passes through the light case 225a and is irradiated toward the inside of the opening 220. Thus, the inside of the opening 220 can be revealed.

Accordingly, when the light door 22 is turned on, the inside of the opening 220 becomes bright. Thus, the food contained in the door basket 221 may be identified through the transparent portion 421a even when the sub-door 40 is closed.

When the door light 225 is turned off, the inside of the opening 220 may be darkened, and the transparent portion 421a may become opaque so that the interior of the opening is invisible. In this connection, the transparent portion 421a may be opaque via the glass 421 of the panel assembly 42. In one example, the transparent portion 421a may look like a mirror plane. The transparent portion 421a refers to a region in the glass 421 where the interior of the opening is visible. To this end, when an opaque bezel is formed around the glass 421, the transparent portion 421a may be made of a region inwardly of the bezel.

In some implementations, the panel assembly 42 may include a glass that changes from transparent to translucent and vice versa, for example using an electrochromic material.

In one example, the door liner 223 may be equipped with a gasket. The gasket may be formed along the perimeter of the door. A cap decoration 50 may be formed on the top face of the door 22. The cap decoration 50 is combined with the door liner 223 and the out plate 222 to define a top face of the door 22. The interior space of the door 22 defined by the out plate 222, the door liner 223 and the cap decoration 50 may be filled with a heat insulating material 224.

In one example, the cap decoration 50 may be made of a plastic material. A hinge mounted space 502 may be recessed in one end of the cap decoration 50 to receive therein a hinge for pivoting of the door 22.

Further, the cap decoration 50 may have a top recess 501 which is depressed downwardly in the cap decoration 50. The top recess 501 may be downwardly depressed except for the outer periphery of the cap decoration 50.

A door opening mechanism 52, the microphone module 53, a speaker module 55, and a PCB (printed circuit board) 56 may be housed inside the top recess 501. Further, a door cover 51 may be shaped to shield the opened top face of the top recess 501.

In some implementations, the door opening mechanism 52 may be configured to, upon activation thereof, open the door automatically without the user having to pull the door 22 directly while the door 22 is closed. The door opening mechanism 52 may have various configurations. In some cases, the door opening mechanism 52 includes a push rod 521 that is selectively protruded. The push rod 521 may be protruded when an opening signal is input. Thus, an end of the push rod 521 pushes the cabinet 10 to open the door 22. When the push rod 521 is retracted, the door 22 can be rotated and closed by its own weight.

A rod opening 501a may be defined at one side of the rear face of the top recess 501 facing the push rod 521. Accordingly, when the door opening mechanism 52 inside the door 22 is operated, the push rod 521 may push the cabinet 10 through the rod opening 501a to open the door 22.

The door opening mechanism 52 may be operated by the user's voice input to the microphone module 53. Therefore, the door 22 may be opened and closed based on the voice of the user.

In order to position the microphone module 53 and the speaker module 55 close to the center of the refrigerator 1, that is, to the left side of the top recess 501, the door opening mechanism 52 may be positioned at the right side in the top recess 501.

The microphone module 53 may be configured to receive a voice of a user for controlling the operation of the refrigerator 1 and may be mounted in the microphone-module mount 511 formed on the door cover 51. The microphone module 53 may be in close contact with the bottom face of the door cover 51 and may be supported by a microphone-module support 54. The microphone-module mount 511 may further have a voice input hole 512 defined therein. Through the voice input hole 512, the voice of the user may be introduced into the microphone module 53 mounted inside the microphone-module mount 511.

The speaker module 55 is configured to output sound, as well as other information such as the operation status information of the refrigerator 1 or user's request information. The speaker module 55 may be located beneath the speaker-module receiving portion 514 formed on the door cover 51. Further, the speaker module 55 may be fixedly mounted on the door cover 51.

The PCB 56 may be connected to the microphone module 53 and the speaker module 55. The PCB 56 may process the voice input from the microphone module 53. Therefore, the PCB 56 may be referred to as a voice recognition PCB. In one example, the PCB 56 may be coupled to the speaker module 55 and process the voice signal to be output to the speaker module 55.

The PCB 56 may be fixedly mounted on the bottom of the top recess 501. The PCB 56 may include a plurality of connectors 561, 562, 563 and 564. In detail, the connectors 561, 562, 563, and 564 include a first connector 562 and a second connector 563 connected to the microphone module 53, a third connector 561 connected to the speaker module 55, and a fourth connector 564 to which power is supplied. Thus, the speaker module 55 or the microphone module 53 may be simply separated from the cap decoration 50 and replaced with another as needed. Thus, it is possible to selectively use the microphone module 53 and the speaker module 55 according to the model specification of the refrigerator 1.

The door cover 51 is formed in a plate shape corresponding to the top open face of the top recess 501. The door cover 51 may be mounted on the cap decoration to shield the top recess 501. The door cover 51 is mounted on the cap decoration 50 to define the top face of the door 22. The microphone module 53 and the speaker module 55 may be fixedly mounted to the door cover 51. That is, the microphone module 53 and the speaker module 55 may be present on the door 22, and may be mounted on the door cover 51 and may be suspended in the inside of the top recess 501.

In particular, the microphone module 53 may be maintained to be attached to the bottom face of the door cover 51, such that the noise introduced into the microphone module 53 may be minimized. For example, in the refrigerator 1, noise vibrations of devices such as a compressor 15 for performing the refrigerating cycle during the operation of the refrigerator are continuously generated. This vibration noise may be conductive along and on the door 22 to prevent the voice input from being transmitted to the microphone module 53.

Thus, the microphone module 53 may be mounted in the interior of the door 22 without being exposed to the outside, but may be spaced from the interior of the door 22. This may minimize the influence of noise generated in the operation of the refrigerator 1. This may improve voice recognition performance.

Hereinafter, the structure of each of the microphone module 53 and the speaker module 55 will be described in more detail with reference to the drawings.

Figure 6:
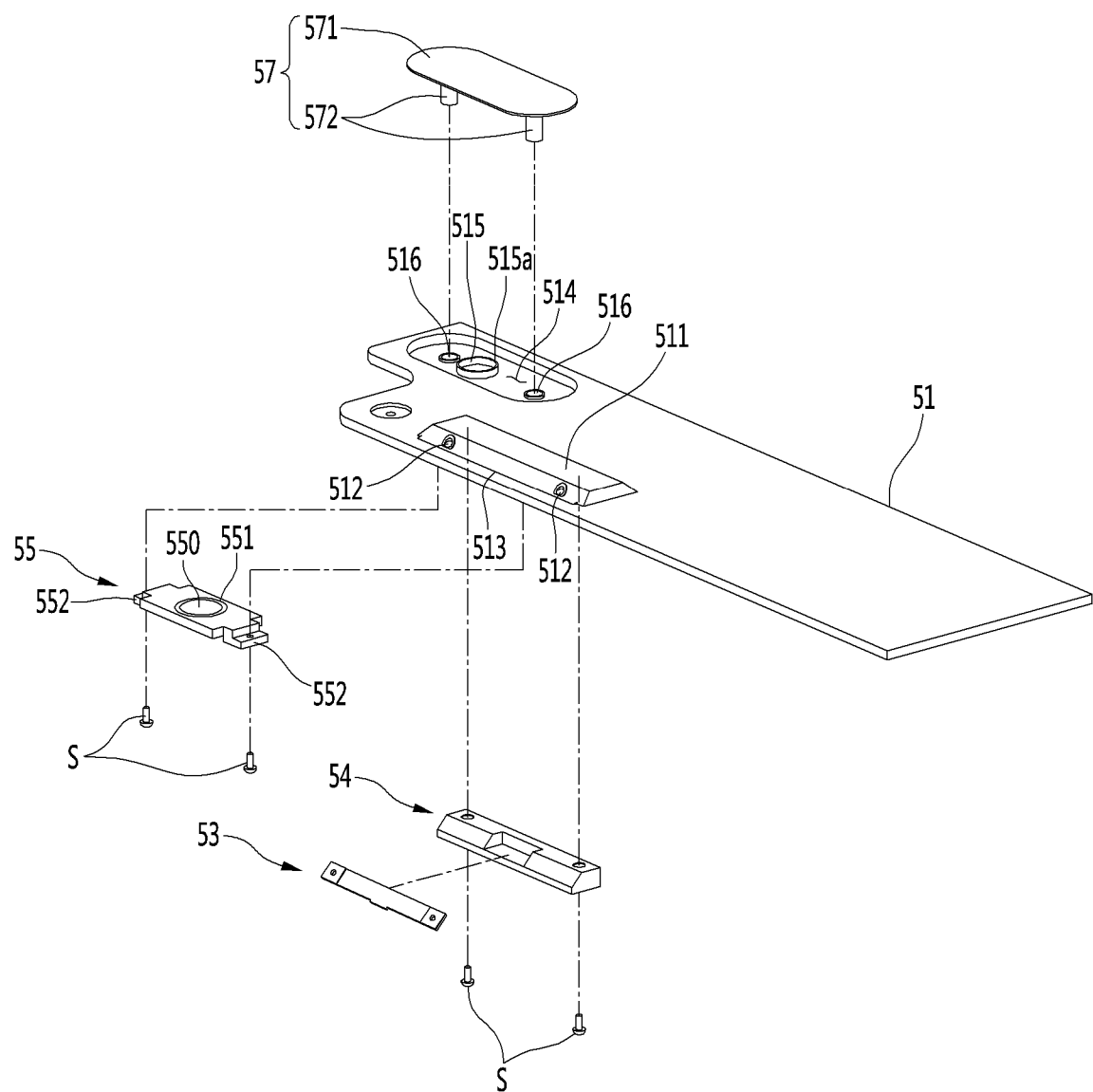
FIG. 6 is an exploded perspective view showing a coupling structure of a cap door cover and a speaker module and a microphone module according to an implementation of the present disclosure.
Figure 7:
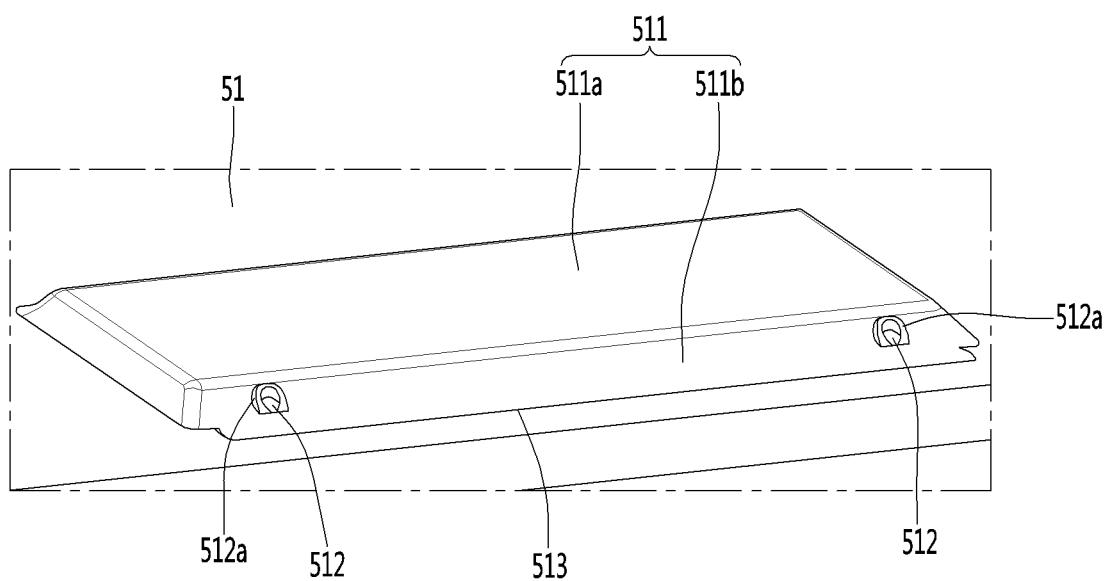
FIG. 7 is a partial enlarged view of a microphone-module mount according to tan implementation of the present disclosure.
Figure 8:
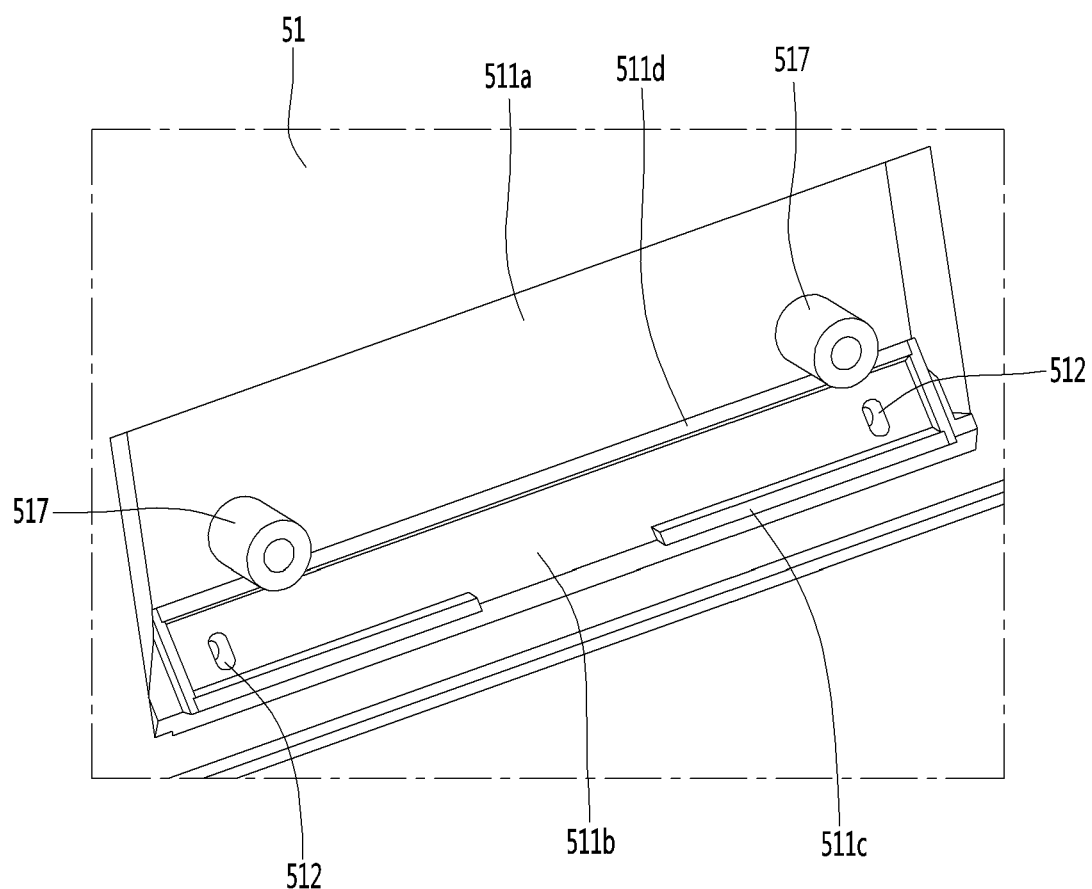
FIG. 8 is a perspective view of the microphone-module mount when viewed from below.
Figure 9:
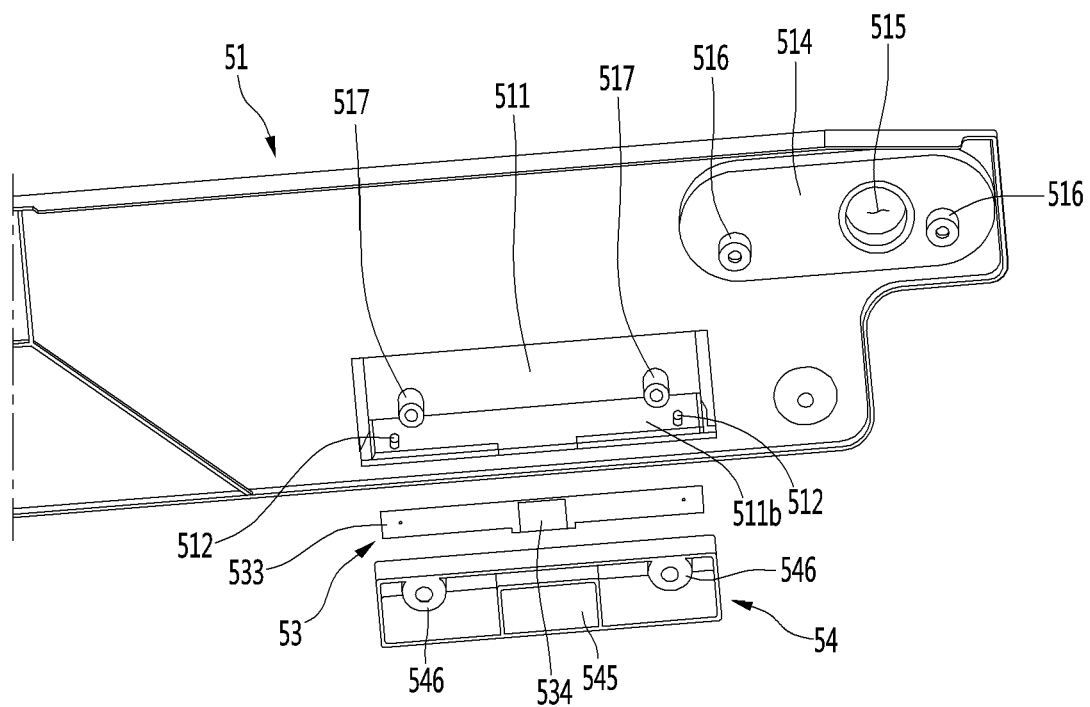
FIG. 9 is an exploded perspective view showing a mounting structure of the microphone module.

FIG. 6 is an exploded perspective view showing the coupling structure of the cap door cover and the speaker module and the microphone module according to the implementation of the present disclosure. FIG. 7 is a partial enlarged view of the microphone-module mount in accordance with an implementation of the present disclosure. FIG. 8 is a perspective view of the microphone-module mount when viewed from below. FIG. 9 is an exploded perspective view showing the mounting structure of the microphone module.

As shown, the microphone-module mount 511 may be formed on the door cover 51. The microphone-module mount 511 may include a protrusion 511a protruding upward from the door cover 51, an inclined portion 511b formed at the front end of the protrusion 511a, and a depression 513 formed at an end of the inclined portion 511b.

The protrusion 511a may protrude to have a top face in parallel with the top face of the door cover 51 and have the highest level of the microphone-module mount 511. A microphone-module mounting boss 517 may be formed underneath the protrusion 511a. The microphone-module mounting boss 517 may be formed at each of left and right sides and may be inserted into a through-hole 546 of the microphone-module support 54. A screw S may be fastened to the microphone-module mounting boss 517 in the through hole 546 so that the microphone-module support 54 may be fixedly mounted to the bottom face of the protrusion 511a.

The protrusion height of the protrusion 511a may be sized such that a proper size of the voice input hole 512 may be defined in the inclined portion 511b. The protrusion height of the protrusion 511a may be sized such that then viewed from the front, the microphone-module mount 511 is invisible. For example, the height of the protrusion 511a may be set to have a height of 2 mm to 3 mm.

The inclined portion 511b may be formed at the front end of the microphone-module mount 511 and have a top face inclined downwardly as it extends in a front direction. The inclined portion 511b may have a top face having an incline of approximately 30 to 50 degrees with respective to the horizontal surface.

The inclined portion 511b may be formed to have a predetermined width and may have a corresponding size and shape so that the microphone module 53 may be in close contact with the bottom surface of the inclined portion 511b. A front rib 511c and a rear rib 511d for fixing the microphone module 53 to the inclined portion may protrude downwards from the bottom surface of the inclined portion 511b. The front rib 511c and rear rib 511d may extend laterally along the front end and rear end of the bottom face of the inclined portion 511b, respectively. Thus, the microphone module 53 may be fitted into between the front rib 511c and the rear rib 511d.

The microphone module 53 may be mounted at the correct position between the front rib 511c and the rear rib 511d. The voice input hole 512 formed in the inclined portion 511b may be aligned with a microphone element 532 of the microphone module 53.

The voice input hole 512 is defined in the inclined portion 511b. The voice input hole 512 may be defined at a position corresponding to a center of the microphone element 532. Thus, the user's voice may be effectively input through the voice input hole 512 to the microphone element 532.

The voice input hole 512 may be defined in left and right sides of the inclined portion 511b. That is, each of the voice input hole 512 and the corresponding microphone element 532 may be provided in a paired manner. Thus, a voice having passed through the pair of voice input holes 512 may be input to the pair of the microphone elements 532.

In some implementations, each of a spacing between the pair of the voice input holes 512 and a spacing between the pair of the microphone elements 532 may be approximately 5 mm to 10 mm based on a typical location of the user. This spacing may allow more effectively analyzing and processing the voice input to the microphone element 532, thereby to improve the voice recognition performance.

A hole guide 512a may be formed around the voice input hole 512. The hole guide 512a may be constructed to protrude along the periphery of the voice input hole 512, and may be formed such that a protruding height thereof decreases as it goes downwardly. Accordingly, when the dust or foreign matter falls from above, the hole guide 512a prevents dust or foreign matter from being directly introduced into the voice input hole 512, so that the dust or foreign matter may flow down and may be guided to the depression 513.

Further, the hole guide 512a is formed on the inclined portion 511b. However, a top face of the hole guide 512a has a larger slope than the top face of the inclined portion 511b so that the voice from the user in front thereof may be delivered more effectively towards the voice input hole 512.

Further, the voice input hole 512 is facing forwards. In this connection, the hole guide 512a may be formed around the voice input hole 512 to prevent sound output from the speaker module 55 from re-entering the microphone element 532. Further, in some cases, the speaker-module receiving portion 514 may be spaced from the microphone-module mount 511 or the voice input hole 512 by at least 80 mm to 120 mm.

In one example, the depression 513 may be defined in front of the inclined portion 511b. The depression 513 may be recessed downward from the end of the inclined portion 511b so that dust or foreign matter falling from above can be gathered therein. Therefore, even when dust or foreign matter falls from above and accumulates on the door cover 51, the voice input hole 512 may not be easily clogged by the dust.

That is, the dust or foreign matter flowing along the inclined portion 511b is accommodated in the depression 513 in front of the inclined portion 511b. Thus, the voice input hole 512 may not be clogged until the depression 513 is completely filled with the dust or debris which then overflows out of the depression 513, such that the voice recognition performance from the user may be maintained reliably.

In one example, the door cover 51 may have a speaker-module receiving portion 514 formed therein, on which the speaker module 55 is mounted. The speaker-module receiving portion 514 may be defined to be depressed downwardly in one area of the door cover 5. The speaker module 55 may be mounted on the bottom face of the speaker-module receiving portion 514.

A sound output hole 515 may be defined in the center of the speaker-module receiving portion 514. An edge protrusion 515a may be formed around the sound output hole 515. The edge protrusion 515a may have a protruding height so as not to touch the speaker-module cover 57. The edge protrusion 515a can prevent dust or foreign matter introduced into the speaker-module receiving portion 514 from entering the speaker module 55.

In one example, a sound output unit 550 of the speaker module 55 is disposed in an inner space defined by the edge protrusion 515a, that is, at a position corresponding to the sound output hole 515. Accordingly, the sound output from the sound output unit 550 can be output to the outside through the sound output hole 515 without leaking into the door 22.

Further, the speaker-module receiving portion 514 may have a pair of speaker-module mounting female bosses 516. The speaker-module mounting female boss 516 may be formed on each of both sides around the sound output hole 515. The speaker-module mounting male bosses 572 may extend downward from the cover 57 and extend to a speaker-module wing 552 at each of both sides.

Further, the speaker-module receiving portion 514 may blocked by the speaker-module cover 57. The speaker-module cover 57 may include a plate portion 571 and speaker-module mounting male bosses 572. The plate portion 571 may have a plate shape. The plate portion 571 may have a shape corresponding to that of the speaker-module receiving portion 514 and may have a slightly smaller size than that of the speaker-module receiving portion 514. Thus, when the speaker-module cover 57 is mounted on the speaker-module receiving portion 514, a perimeter of the speaker-module receiving portion 514 and a perimeter of the speaker-module cover 57 are spaced apart from each other. Thus, the sound output from the speaker module 55 may leak out through the spacing therebetween.

The speaker-module mounting male boss 572 may extend downward from the bottom face of the speaker-module cover 57. The speaker-module mounting male boss 572 may extend through the speaker-module mounting female boss 516 to the speaker-module wing 552. A screw S may pass through the speaker-module wing 552 and then may be fastened to the speaker-module mounting male boss 572 so that the speaker-module cover 57 and the speaker module 55 are fixedly mounted on the door cover 51.

Figure 10:
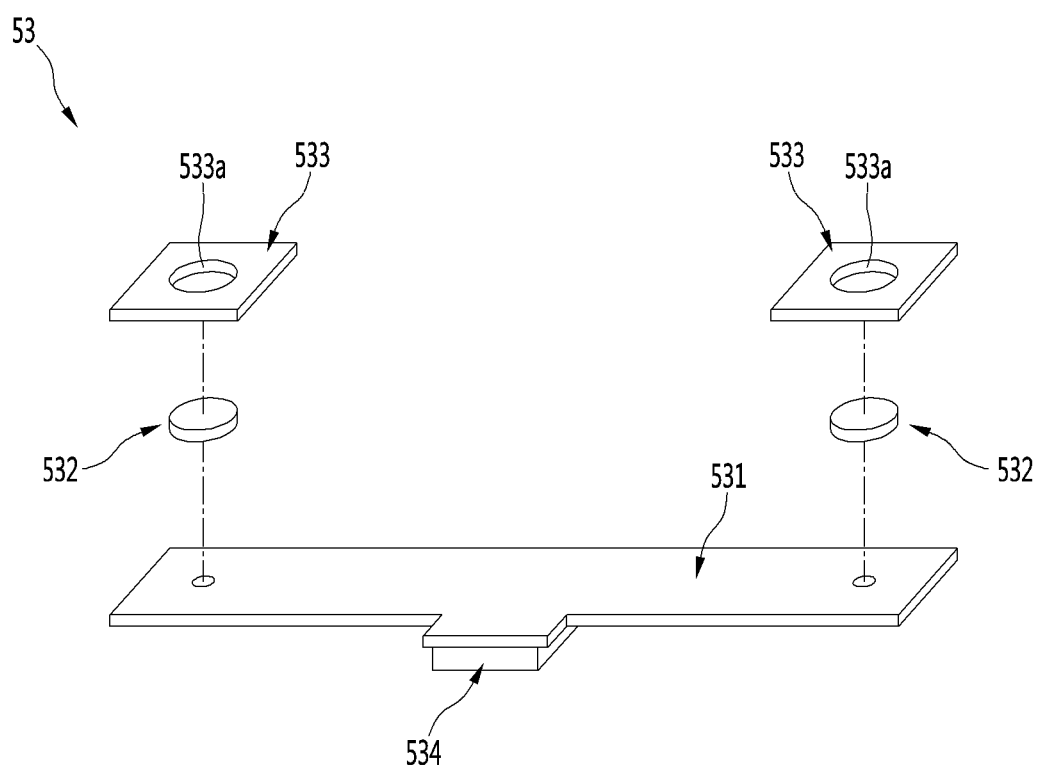
FIG. 10 is an exploded perspective view of the microphone module.

FIG. 10 is an exploded perspective view of the microphone module.

Referring to the microphone module 53 based on the drawing, the microphone module 53 may include a microphone substrate 531, a microphone element 532, and a sealing member 533.

Specifically, the microphone substrate 531 is configured for allowing the microphone elements 532 to be mounted thereon and supported thereon to be spaced from each other by a predetermined spaced distance. The microphone substrate 531 may be elongated in the length direction so as to be mountable to the inclined portion 511*b* of the microphone-module mount 511.

A microphone connector 534 may be provided at the center of the bottom face of the microphone substrate 531. The microphone connector 534 may protrude downwards and be inserted into a connector hole 545 defined in the microphone-module support 54. Thus, the first and second connectors 563 of the PCB 56 and the microphone connector 534 may be connected to each other by a harness having both ends connected to the connectors without interference from the microphone-module support 54.

The microphone element 532 may receive voice input and may be mounted on each of both sides of the top face of the microphone substrate 531. The microphone element 532 may be located at a position corresponding to the voice input hole 512 when the microphone module 53 is mounted on the mount 511, so that the user's voice may be input to the element 532. The microphone element 532 may employ various elements having structures capable of receiving voice input from the user. For example, the microphone element 532 may include a variety of devices that may receive voice input. Therefore, the microphone element 532 may be referred to as a microphone or microphone device.

The sealing member 533 is disposed on each of both sides of the top face of the microphone substrate 531 and surrounds the microphone element 532. The sealing member 533 may be disposed at each of both ends of the microphone substrate 531 and may be disposed between and in tight contact with the microphone substrate 531 and the inclined portion 511*b* of the microphone-module mount 511.

The sealing member 533 may be made of an elastic material and may be adhered to the top face of the microphone substrate 531 and the bottom face of the inclined portion 511*b*. The sealing member 533 may be an adhesive tape or a double-sided tape.

A hole 533*a* may be defined at the center of the sealing member 533. The microphone element 532 may be located inside the hole 533*a*. The sealing member 533 may be constructed to be thicker than the microphone element 532.

Thus, while the microphone module 53 is pressed against the microphone-module support 54, the sealing member 533 may completely seal around the microphone element 532 to prevent the noise from being introduced to the microphone element 532.

Additionally, the sealing member 533 may effectively buffer shock or vibration generated when the door 22 is opened or closed due to the nature of the use environment of the door 22. Further, the sealing member 533 may allow the mounting position of the microphone module 53 to be maintained and the element 532 to be sealed so that excellent voice recognition performance can be maintained. Further, vibrations and shocks from the cabinet 10 during the operation of the refrigerator 1 may also be mitigated by the sealing member 533.

Figure 11:
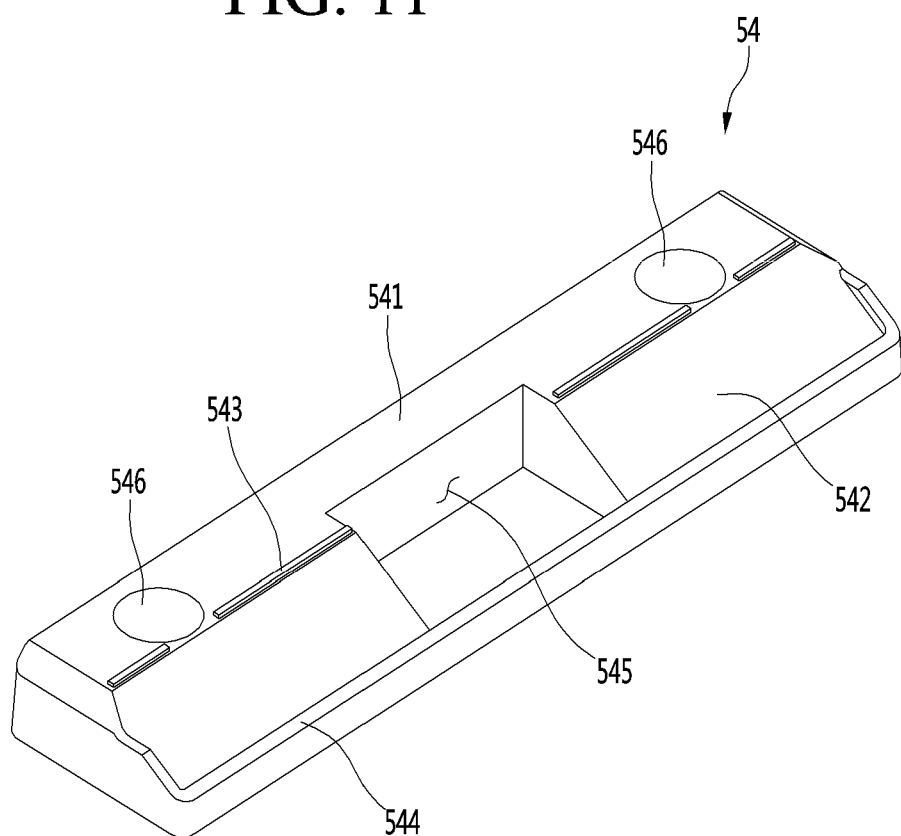
FIG. 11 is a perspective view of a microphone-module support according to an implementation of the present disclosure.

FIG. 11 is a perspective view of a microphone-module support according to an implementation of the present disclosure.

As shown in the figure, the microphone-module support 54 is mounted on the door cover 51 so that the microphone module 53 can be tightly fixed to the inclined portion 511*b* of the door cover 51. The top face of the microphone-module support 54 may include a mounting face 541 and a supporting face 542.

The mounting face 541 is configured for mounting the microphone-module support 54 on the cover 51. The face 541 may be parallel to the bottom face of the door cover 51. More specifically, the face 541 may be parallel to the bottom face of the protrusion 511*a*. A pair of supporter through-holes 546 may be respectively defined in both sides of the mounting face 541 to penetrate the microphone-module support 54 in the up-and-down direction. The screw S may upwardly pass through the supporter through-hole 546 and be fastened to the microphone-module mounting male boss 517.

The supporting face 542 is formed in front of the mounting face 541 and is inclined downwardly as it goes in the front direction. The supporting face 542 may be sized such that the microphone module 53 is mounted thereon. The face 542 may be constructed to have a slope corresponding to the inclined portion 511*b* of the microphone-module mount 511. Thus, the microphone module 53 may be disposed between the inclined portion 511*b* and the supporting face 542.

Moreover, from a rear end of the supporting face 542, an upper rib 543 may protrude to be in contact with the rear rib 511*d*. A lower rib 544 to be in contact with the front rib 511*c* may protrude from the front end of the supporting face 542.

The lower rib 544 has a predetermined height. The lower rib 544 may define an edge protrusion 515*a* extending upward along a front edge and a portion of a side edge of the microphone-module support 54. Accordingly, when the microphone-module support 54 is mounted on the cover 51, the front rib 511*c* and the rear rib 511*d* may be positioned between the upper rib 543 and the lower rib 544, while the depression 513 of the microphone-module mount 511 may be inserted into a space between the supporting face 542 and the lower rib 544.

In accordance with this structure, the microphone-module support 54 can be mounted in the correct position. The guide structure of the ribs 511*c*, 511*d*, 543, and 544 guides the microphone-module support 54 to be mounted at an accurate position where optimal voice recognition performance can be maintained.

In one example, a connector hole 545 may be defined in the center of the microphone-module support 54. Thus, while the microphone module 53 is mounted on the supporting face 542, the microphone connector 534 may be exposed downwardly through the connector hole 545. Accordingly, the microphone module 53 may be connected to the PCB 56 while the microphone module 53 is fixedly mounted on the door cover 51.

Figure 12:
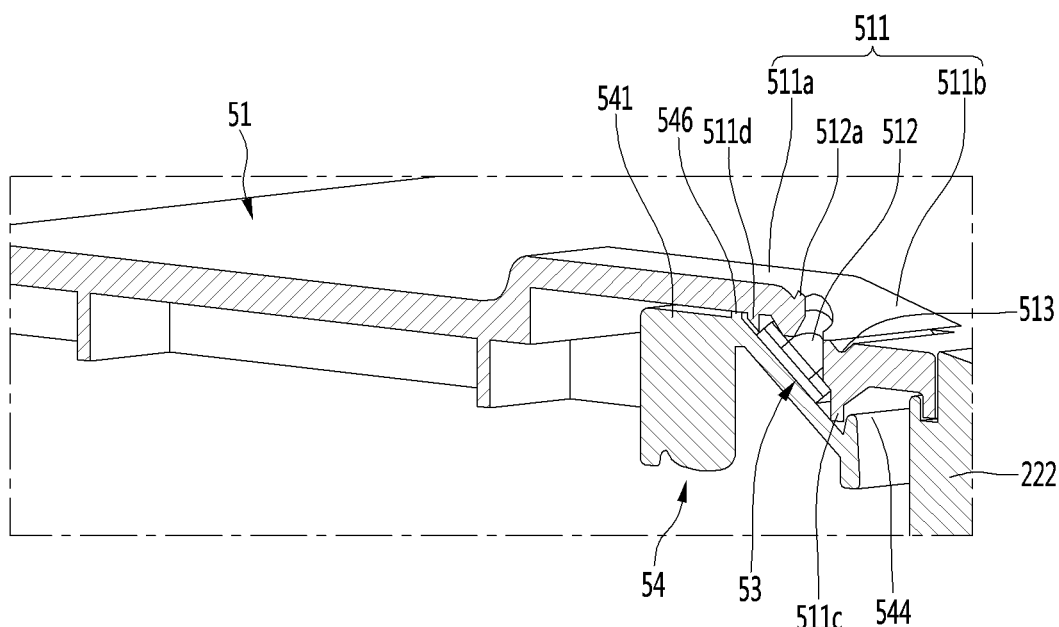
FIG. 12 is a cross-sectional view showing a coupling structure of the microphone module and microphone-module support.
Figure 13:
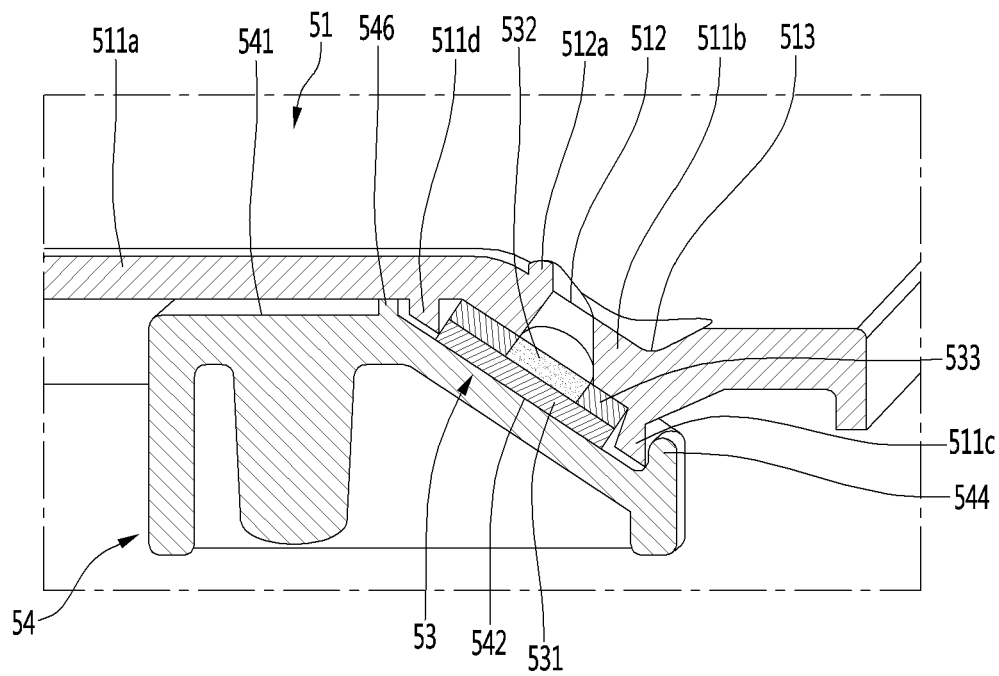
FIG. 13 is a partial enlarged view showing a combination of the microphone module and the microphone-module support.

FIG. 12 is a cross-sectional view showing a coupling structure of the microphone module and microphone-module support. FIG. 13 is a partial enlargement of the coupling state of the microphone module and microphone-module support.

Referring to the mounting structure of the microphone module 53 in detail based on the drawings, the microphone module 53 is mounted on the supporting face 542 of the microphone-module support 54. In this connection, the microphone connector 534 is located inside the connector hole 545.

The microphone-module support 54 with the microphone module 53 mounted thereon is placed on the microphone-module mount 511. In this connection, the mounting face 541 of the microphone-module support 54 is mounted on the bottom face of the protrusion 511*a* of the microphone-module mount 511. Then, the screw S below the microphone-module support 54 passes through the supporter through-hole 546 and then is fastened to the microphone-module mounting male boss 517.

The upper rib 543 and the lower rib 544 may be coupled to the front rib 511*c* and the rear rib 511*d* respectively and may contact the outer faces of the front rib 511*c* and the rear rib 511*d* respectively while the screw S has been fastened to the boss 517. Thus, the microphone-module support 54 may be positioned in the correct position. As a result, the microphone element 532 of the microphone module 53 and the voice input hole 512 can be aligned with each other.

Further, the microphone module 53 is located in the space between the front rib 511*c* and the rear rib 511*d*. The sealing member 533 of the microphone module 53 seals between the microphone PCB 56 and the bottom face of the inclined portion 511*b*.

Particularly, when the screw S for mounting the microphone-module support 54 to the cover 51 is completely tightened, the microphone-module support 54 presses the microphone module 53 against the bottom face of the inclined portion 511*b*. Thus, the sealing member 533 may be compressed to seal the space between the microphone PCB 56 and the back surface of the inclined portion 511*b*.

Thus, user's voice entering the voice input hole 512 may be more efficiently transmitted to the microphone element 532 without leakage. In addition, unwanted noise may be prevented from entering the microphone element 532.

In one example, the voice input hole 512 may be defined so that its diameter widens in a downward direction, that is, in a direction approaching the microphone element 532. Therefore, the voice introduced into the voice input hole 512 may be effectively transmitted to the microphone element 532 and minimize the generation of noise.

Hereinafter, the mounting structure of the speaker module 55 will be described in more detail with reference to the drawings.

Figure 14:
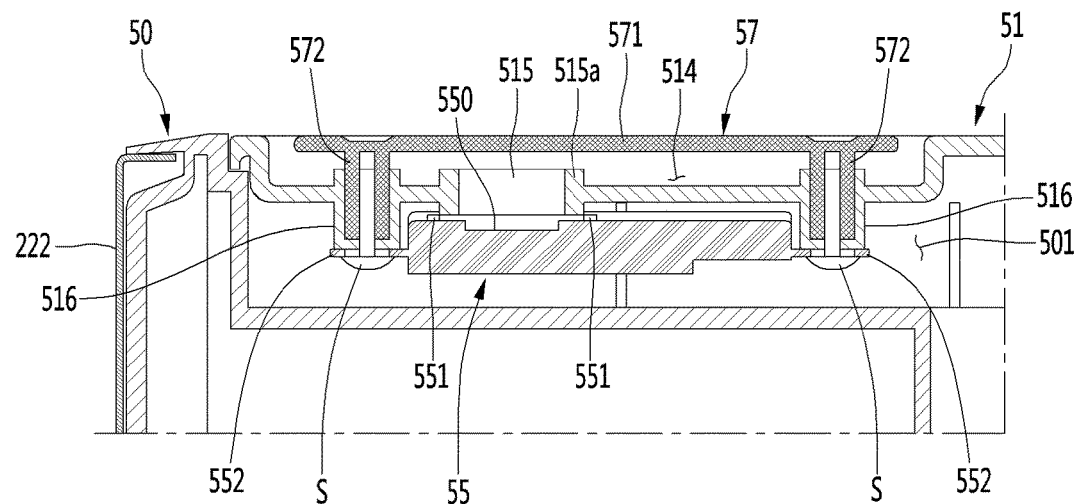
FIG. 14 is a cross section showing a mounting structure of a speaker module.

FIG. 14 is a cross section showing the mounting structure of the speaker module.

The speaker module, as shown, may be disposed on the bottom face of the speaker-module receiving portion 514. In this connection, a sound output unit 550 for outputting voice is present on the speaker module 55 to face the sound output hole 515. An output unit guide 551 may extend around the sound output unit 550. The output unit guide 551 may be constructed to abut the outer edge of the edge protrusion 515*a* formed on the speaker-module receiving portion 514. Thus, the speaker module 55 may be mounted in the correct position and the sound output from the sound output unit 550 may be transmitted externally through the sound output hole 515.

The speaker-module cover 57 covers the speaker-module receiving portion 514. The speaker-module mounting male boss 572 penetrates the speaker-module mounting female boss 516. The screw upwardly passing through the speaker-module wing 552 is coupled to the speaker-module mounting male boss 572 to couple the speaker-module cover 57 and the speaker module 55 together.

The speaker-module cover 57 may be flush with the top faces of the door cover 51 and the cap decoration 50 when the cover 57 is mounted on the speaker-module receiving portion 514. Then, the sound output to the speaker module 55 passes through the sound output hole 515 and then leaks between the periphery of the speaker-module cover 57 and the periphery of the speaker-module receiving portion 514.

Hereinafter, the operation of the refrigerator 1 having the above structure will be described.

Figure 15:
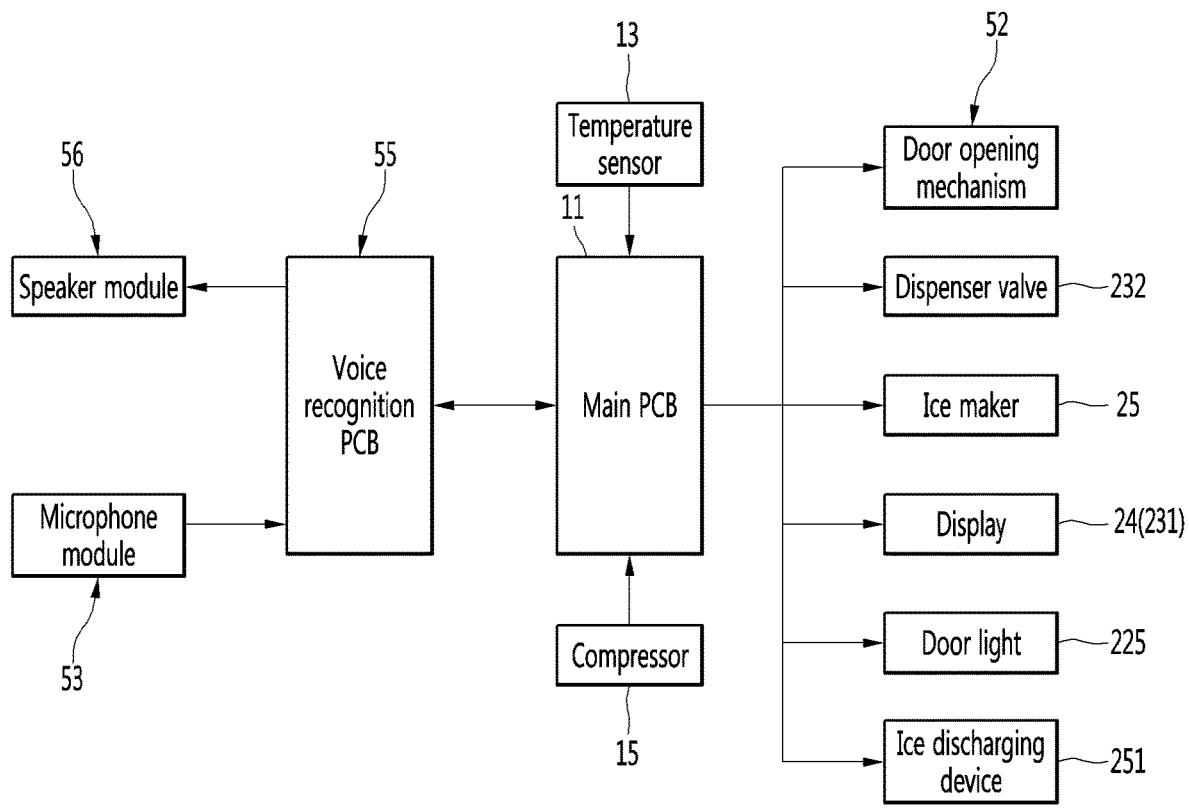
FIG. 15 is a block diagram showing a control signal flow for the refrigerator.

FIG. 15 is a block diagram showing the control signal flow of the refrigerator.

As shown in the figure, the refrigerator 1 is operated under the control of the main PCB 11 to operate the refrigeration cycle including the compressor 15 to cool the inside of the refrigerator. The main PCB 11 controls the overall operation of the refrigerator and may be called a main controller or controller.

To operate the refrigerator 1, the user can directly manipulate the display 24 of the refrigerator 1 or the auxiliary display 231. Further, the user can enter manipulation inputs to manipulate the temperature of the refrigerator 1, or to manipulate the performance of certain functions. Further, the manipulation such as manipulation of the water or ice extraction through the dispenser 23 or turning the door light 225 on and off for viewing through the sub-door 40 may be realized using the user input.

In one example, the user can control the operation of the refrigerator 1 by allowing the microphone module to recognize the user's voice at a remote location where the user is far away from the refrigerator or when the user cannot use both hands.

For example, when the user utters a set trigger command in front of the refrigerator 1, the voice recognition mode is activated by the microphone module 53 and the voice recognition PCB 56. The user can then give the voice command for the operation of the refrigerator 1. When the user issues the command, the voice signal input through the microphone module 53 is processed by the voice recognition PCB 56 and then transmitted to the main PCB 11. In this way, the specific operation of the refrigerator can b be controlled.

An example of a function manipulated by a user's voice is given below.

For instance, the user can check the operation status of the refrigerator 1 by turning on the display 24 of the refrigerator 1 via voice command. Further, the temperature sensed by the temperature sensor 13 may be output to the display 24 by turning on the display 24 of the refrigerator 1 via the voice command. The user can adjust the temperature of the refrigerating compartment and the freezing compartment via the voice input with reference to the output temperature or may control the refrigerator to operate in the desired state via the voice input.

The user may also turn on and off the door light 225 via voice command. When the door light 225 is turned on and off, the sub-door 40 may become selectively transparent or opaque. When the door light 225 is turned on, the transparent portion 421*a* of the sub-door 40 becomes visible so that the interior of the door basket 221 can be identified even when the sub-door 40 is closed.

Further, the user can manipulate the dispenser 23 via the user's voice command. The user can also dispense water or ice via the user's voice command. The user may control the dispenser valve 232 via voice command indicating the desired amount of water. Subsequently, the dispenser valve 232 and the dispenser 23 may operate according to the set operation so that the desired amount of water is dispensed.

In some cases, the user may select the ice state of the ice maker 25 through the user's voice. For example, if the user chooses an ice state, such as crushed ice or normal ice, the ice maker 25 or the ice discharging device 251 provided in the ice bank for storing the ice may perform the set operation so that the ice having the selected ice state is dispensed through the dispenser 23.

Further, various operation information including the change of the operation state or the setting state of the refrigerator 1 may be displayed on the display 24 or the auxiliary display 231, and may be output through the speaker module 55 audio prompts.

Further, the speaker module 55 may output not only the operation information but also the sound notification about whether the user voice input to the microphone module is valid. Thus, the user is prompted to input the correct voice command to the refrigerator 1.

In one example, the refrigerator 1 according to an implementation of the present disclosure may have various other implementations besides the above-described implementation.

Another implementation of the present disclosure relates to a structure in which a single door opens and closes a single space. The cap decoration in this implementation is different from the above implementations. The other components except for the cap decoration are the same as in the above implementations. Thus, the same reference numerals are used for the same components, and a detailed description thereof will be omitted.

Figure 16:
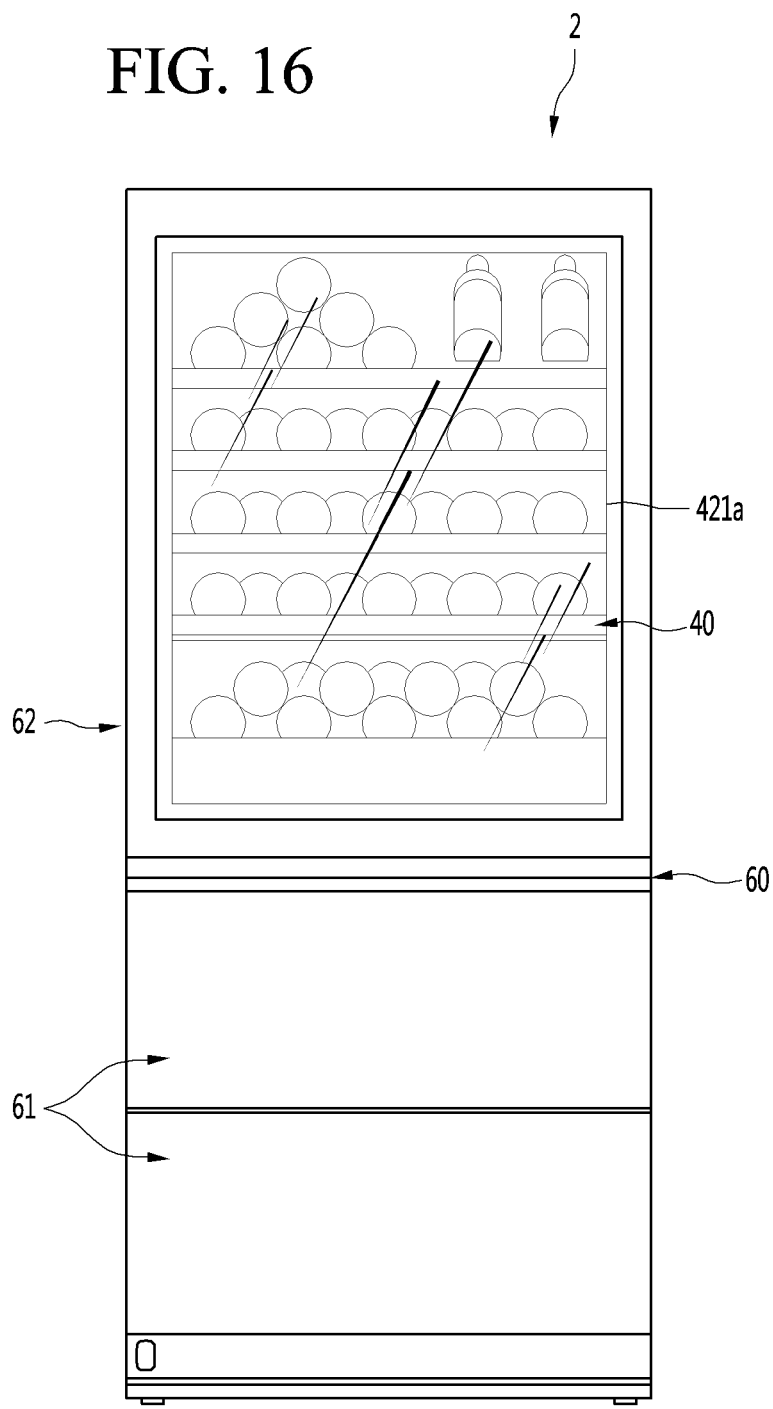
FIG. 16 is a front view of a refrigerator in accordance with another implementation of the present disclosure.
Figure 17:
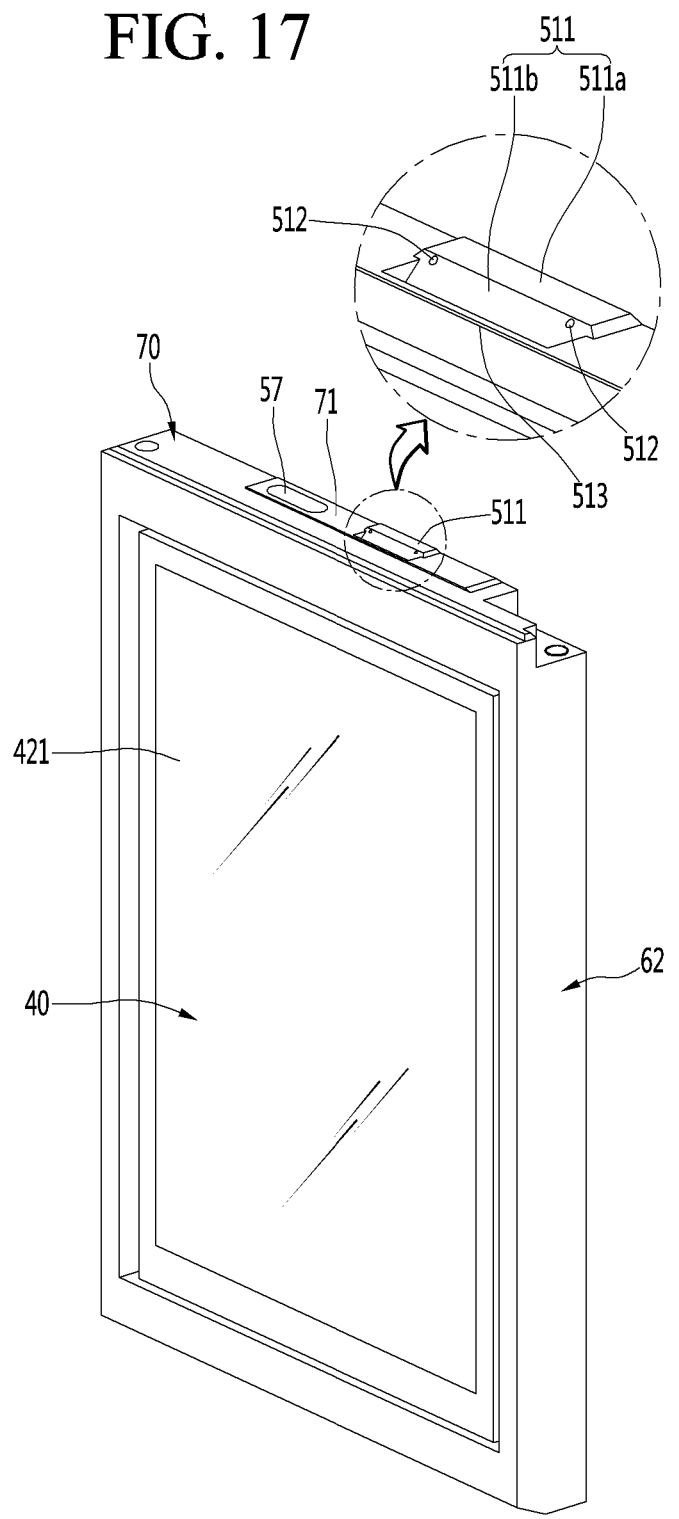
FIG. 17 is a perspective view of a refrigerator door according to another implementation of the present disclosure.

FIG. 16 is a front view of a refrigerator in accordance with another implementation of the present disclosure. FIG. 17 is a perspective view of a refrigerator door in accordance with another implementation of the present disclosure.

Another implementation of the present disclosure includes a refrigerator 2 including a cabinet 60 defining a storage space and doors 61 and 62 opening and closing the cabinet 60.

In the cabinet 60, the space may be partitioned vertically. The upper and lower compartments may be maintained at different temperatures. The door may include an upper door 62 that opens and closes the upper storage space and at least one lower door 61 that opens and closes the lower storage space.

The upper door 62 is pivotally mounted to the cabinet. The upper storage space is opened and closed by pivoting the door 62. The lower door 61 are mounted in a retractable or extended manner. The lower storage space is opened and closed by retracting or extending the door 61. Hereinafter, the upper door 62 may be referred to as a door 62.

The door 62 has the sub-door 40 pivotally coupled thereto to open or close a central opening of the door 62. The appearance of the door 62 may be defined by an out plate 621, a door liner, and a cap decoration 70 as in the implementations described above. The inner space defined by the out plate 621, the door liner and the cap decoration 70 may be filled with the insulation material.

The cap decoration 70 has a top recess 701 defined therein. The top recess 701 is shielded by a door cover 71. The microphone module 53 and the microphone-module support 54 and the speaker module 55 are mounted on the door cover 71. On the cap decoration 70 and the door cover 71, there are mounted the microphone module 53 and the speaker module 55 which are the same as those of the implementation as described above in terms of the configurations except for the size and shape.

To this end, the microphone-module mount 511 having the protrusion 511a, the inclined portion 511b, the depression 513, and the voice input hole 512 is formed on one side of the door cover 71. On the other side of the door cover 71, the speaker-module mounting portion 514 is defined in which the sound output hole 515 and the edge protrusion 515a and the speaker-module mounting boss 516 are formed. The speaker module 55 is received in the speaker-module mounting portion 514. The speaker-module cover 57 covers the speaker-module mounting portion 514.

Figure 18:
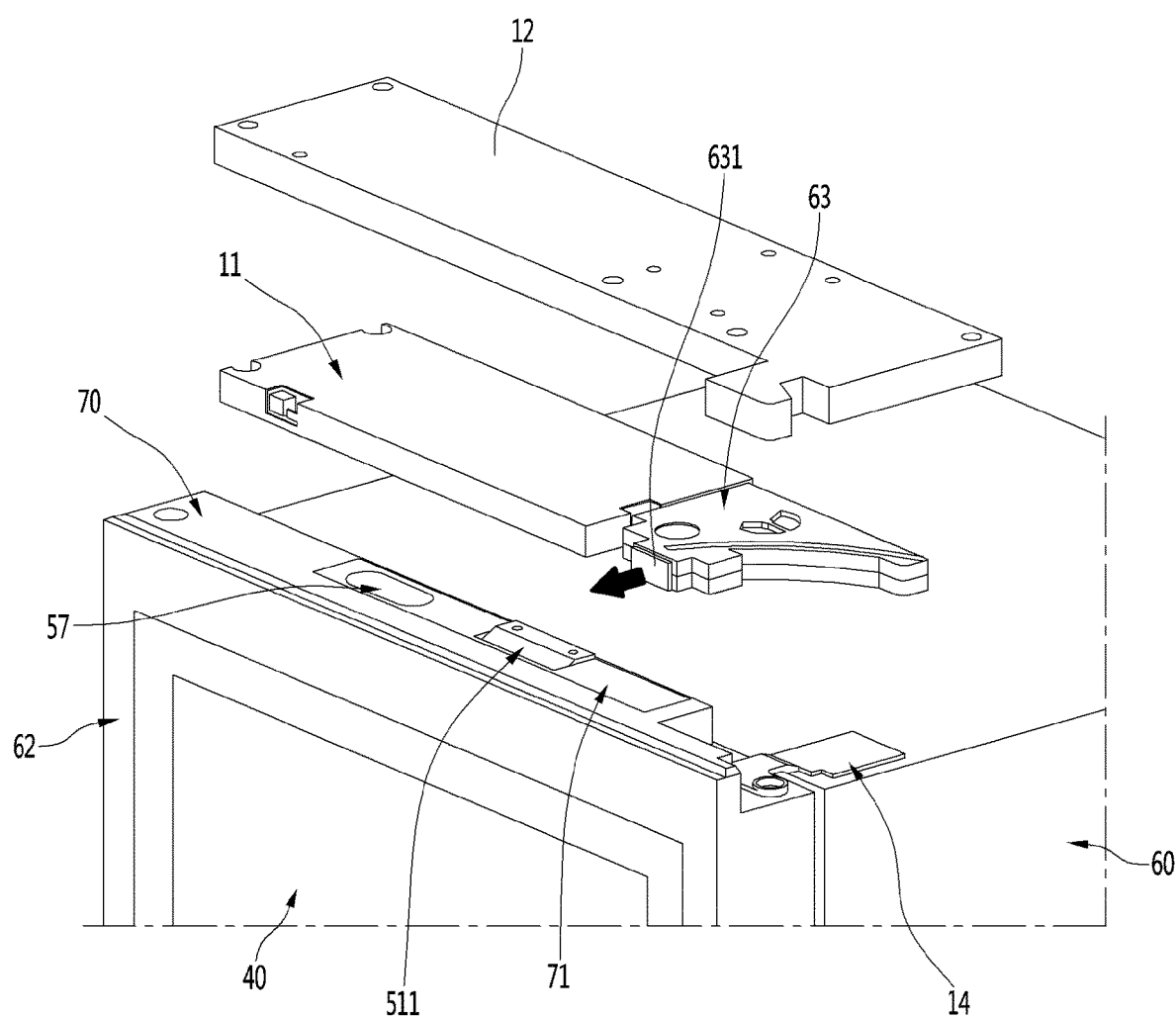
FIG. 18 is an exploded perspective view showing a mounting structure of a door opening mechanism in accordance with another implementation of the present disclosure.
Figure 19:
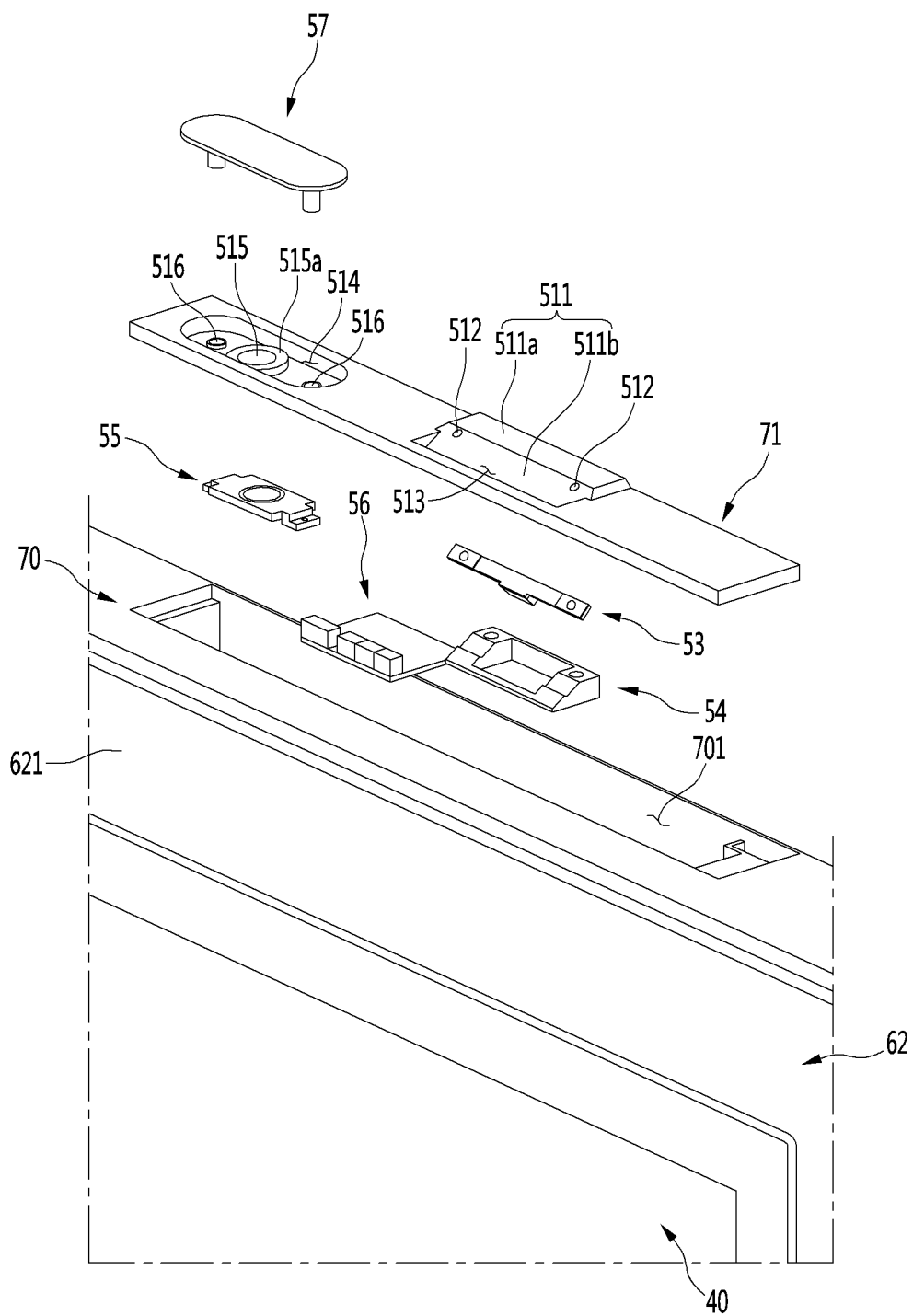
FIG. 19 is an exploded perspective view of a top portion of the refrigerator door.

FIG. 18 is an exploded perspective view showing a mounting structure of the door opening mechanism in accordance with another implementation of the present disclosure. FIG. 19 is an exploded perspective view of a top portion of a refrigerator door.

As shown, a main PCB 11 is provided on the top face of the door cabinet 60. The door opening mechanism 63 may be provided on the side to the main PCB 11. The door opening mechanism 63 is configured so that the push rod 631 may be extended or retracted. When the push rod 631 is extended or protruded, the rear face of the door 62 may be pushed by the rod 631 to open the door 62. When the push rod 631 is retracted, the door 62 is closed by its own weight.

The main PCB 11 and the door opening mechanism 63 are mounted on the top face of the cabinet 60 and in a front portion thereof. A top portion of the cabinet 60 may include a main case 12 which accommodates both the main PCB 11 and the door opening mechanism 63 as well as a hinge mechanism 14 for opening and closing the door 62.

In one example, in another implementation of the present disclosure, the thickness of the door 62 may be relatively small. In such cases, the relatively large door opening mechanism 63 may not be located in the cap decoration 70, but rather mounted on the cabinet 60 to push and rotate the door 62.

The door opening mechanism 63 may be disposed on the cabinet 60 to achieve a slim profile of the door 62. Thus, the insulation loss of the door 62 may be minimized even in a slim structure.

The microphone module 53, the speaker module 55, and the voice recognition PCB 56 may be disposed in the interior of the top recess 701. The speaker module 55 and the microphone module 53 have the same structure as in the above-mentioned implementations. The connection structure thereof with the door cover 71 may be the same as in the above-mentioned implementations. However, there is a difference only in the placement position thereof therebetween. Accordingly, it may be known that the positions of the microphone-module mount 511 and the speaker-module receiving portion 514 are different from those in the above-mentioned implementations.

In one example, in another implementation of the present disclosure, the refrigerator 2 has a structure that one door 62 opens and closes the storage space. Therefore, in order to improve the voice recognition performance from the user, the microphone-module mount 511 may be located in the middle position of the left region of the door 62. The door opening mechanism 63 is positioned on the cabinet 60. Thus, the location of the microphone module 53 and the microphone-module mount 511 may be present at the central region of the door 62.

The microphone module 53 and the speaker module 55 are different from those in the above-described implementations only in term of the positions but are the same as those in the above-described implementations in terms of the configuration. Therefore, the detailed structures thereof are to be replaced with those in the above-described implementation.

The implementations of the present have been described with reference to a DID (door in door) type refrigerator where the door has an opening and a sub-door 40 is present for opening and closing the opening. However, the implementations of the present may be applied to all types of refrigerators that may include the cap decoration 70, including a drawer-type door as well as a rotary type door without the sub-door 40.

The implementations of the present disclosure as disclosed in the present specification and drawings are merely illustrative of specific examples for purposes of understanding of the present disclosure, and, thus, are not intended to limit the scope of the present disclosure. It will be apparent to those skilled in the art that other variations based on the technical idea of the present disclosure other than the implementations disclosed herein are feasible.

What is claimed is:

1. A refrigerator comprising:
    a cabinet having a storage space therein;
    a door configured to open and close at least a portion of the storage space, the door including a recess that is recessed from a top surface portion of the door and a door cover that covers the recess;
    a microphone module disposed in the recess and configured to receive a voice command from a user; and
    a controller configured to control an operation of the refrigerator based on the voice command received at the microphone module,
    wherein the door cover defines:
        a microphone-module mount to which the microphone module is mounted, the microphone-module mount defining a part of an upper exterior surface of the door cover, and
        a voice input hole at the microphone-module mount, the voice input hole being configured to transmit a sound of the voice command from an outside of the door cover to the microphone-module.

2. The refrigerator of claim 1, wherein the microphone-module mount protrudes upward from the door cover.

3. The refrigerator of claim 2, wherein the voice input hole is oriented toward a forward direction of the refrigerator, a height of the microphone-module mount being greater than a diameter of the voice input hole.

4. The refrigerator of claim 1, wherein the microphone-module mount includes:
    a protrusion protruding upward from the door cover; and
    an inclined portion extending downward from the protrusion toward a forward direction of the refrigerator, and
    wherein the voice input hole is defined at the inclined portion.

5. The refrigerator of claim 4, wherein the microphone-module mount defines a depression that is positioned forward of the inclined portion, wherein the inclined portion extends downward to a bottom of the depression.

6. The refrigerator of claim 4, wherein the microphone-module mount further includes a hole guide that protrudes from the inclined portion and is disposed around the voice input hole, wherein a protrusion length of the hole guide from the inclined portion decreases in a downward direction.

7. The refrigerator of claim 4, wherein the microphone module is mounted on a rear face of the inclined portion, the microphone module being spaced from an inner surface of the recess.

8. The refrigerator of claim 7, wherein the microphone module includes:
    a microphone substrate disposed on the inclined portion;
    a microphone element placed on the microphone substrate and located at a position corresponding to the voice input hole; and
    a sealing member that is disposed between the microphone substrate and the inclined portion and covers the microphone element.

9. The refrigerator of claim 8, wherein the sealing member is made from an elastic material and has a thickness that is greater than that of the microphone element.

10. The refrigerator of claim 8, wherein a microphone-module support supporting the microphone module thereon is mounted on a bottom face of the microphone-module mount.

11. The refrigerator of claim 10, wherein the microphone-module support includes:
    a mounting face portion in contact with and coupled to the protrusion; and
    a supporting face portion extending from a front end of the mounting face portion and having a same slope as the inclined portion, and
    wherein the microphone module is mounted on the supporting face portion.

12. The refrigerator of claim 11, wherein the microphone-module support has a connector hole defined therein, the connector hole exposing a microphone connector protruding downward from the microphone substrate.

13. The refrigerator of claim 11, wherein the microphone-module mount further includes front and rear ribs respectively extending along front and rear ends of the inclined portion, wherein the front and rear ribs protrude downward and contact front and rear ends of the microphone module respectively to receive the microphone module therebetween, and
    wherein the microphone-module support further includes upper ribs and lower ribs respectively extending along front and rear ends of the supporting face portion and being in contact with outer sides of the front ribs and rear ribs respectively.

14. The refrigerator of claim 1, wherein the voice input hole includes a plurality of voice input holes that are spaced apart from each other, wherein the microphone module includes a plurality of microphone elements corresponding to the plurality of voice input holes.

15. The refrigerator of claim 1, wherein the refrigerator further comprises:
    a speaker module accommodated in the recess and configured to audibly output a refrigerator operation status and information;
    a speaker-module receiving portion recessed in the door cover at a position of the door cover corresponding to the speaker module, wherein the speaker module is accommodated in the speaker-module receiving portion;
    a sound output hole defined in the speaker-module receiving portion, wherein a sound output unit of the speaker module is in communication with the sound output hole; and
    a speaker-module cover that covers the sound output hole.

16. The refrigerator of claim 15, wherein an outer perimeter of the speaker-module cover is spaced from an outer perimeter of the speaker-module receiving portion.

17. The refrigerator of claim 15, wherein a protruding edge extends around the sound output hole to filter dust from entering into the sound output hole, wherein the protruding edge protrudes to a vertical level below a bottom face of the speaker-module cover.

18. The refrigerator of claim 15, wherein the recess receives therein a voice-recognition printed circuit board (PCB) connected to the microphone module and configured to process a signal input from the microphone module.

19. The refrigerator of claim 11, wherein the recess houses therein a door opening mechanism configured to push the cabinet to open the door, wherein the door opening mechanism is activated based on the voice command from the voice command received by the microphone module.

20. A refrigerator comprising:
a cabinet having a storage space therein;
a door configured to open and close at least a portion of the storage space, the door including (i) a cap decoration that is mounted on a top surface portion of the door and defines a recess and (ii) a door cover that covers the recess;
a microphone module disposed in the recess and configured to receive a voice command from a user; and
a controller configured to control an operation of the refrigerator based on the voice command input to the microphone module,
wherein the door cover defines:
a microphone-module mount to which the microphone module is mounted, and
a voice input hole at an inclined surface of the microphone-module mount and configured to transmit a sound of the voice command from an outside of the door cover to the microphone module, and
wherein the microphone-module mount protrudes upward from the door cover.

21. A refrigerator comprising:
a cabinet having a storage space therein;
a door configured to open and close at least a portion of the storage space, the door including a recess that is recessed from a top surface portion of the door and a door cover that covers the recess;
a microphone module disposed in the recess and configured to receive a voice command from a user; and
a controller configured to control an operation of the refrigerator based on the voice command received at the microphone module,
wherein the door cover defines:
a microphone-module mount to which the microphone module is mounted, and
a voice input hole at the microphone-module mount, the voice input hole being configured to transmit a sound of the voice command from an outside of the door cover to the microphone-module,
wherein the microphone-module mount includes:
a protrusion protruding upward from the door cover, and
an inclined portion extending downward from the protrusion toward a forward direction of the refrigerator, and
wherein the voice input hole is defined at the inclined portion.

* * * * *